United States Patent [19]

Orban

[11] 4,192,586

[45] Mar. 11, 1980

[54] ELECTRONIC SYSTEM FOR PHOTOGRAPHIC DEVICES

[75] Inventor: Jean Orban, Santa Monica, Calif.

[73] Assignee: Vivitar Corporation, Santa Monica, Calif.

[21] Appl. No.: 597,479

[22] Filed: Jul. 21, 1975

[51] Int. Cl.² .............................................. G03B 17/20
[52] U.S. Cl. ........................................ 354/24; 354/50; 354/51; 354/53; 354/60 R; 354/60 L
[58] Field of Search ................... 354/23 D, 24, 51, 53, 354/60 R, 60 A, 60 L

[56] References Cited

U.S. PATENT DOCUMENTS

| | | | |
|---|---|---|---|
| 3,679,905 | 7/1972 | Watanabe | 354/24 |
| 3,818,495 | 6/1974 | Sagra et al. | 354/23 D |
| 3,843,249 | 10/1974 | Kitavra | 354/23 D |
| 3,852,778 | 12/1974 | Iura | 354/24 |
| 3,863,263 | 1/1975 | Itagaski | 354/24 |
| 3,895,875 | 7/1975 | Kitavra et al. | 354/53 |
| 3,896,455 | 7/1975 | Steinbate | 354/24 |
| 3,955,892 | 5/1976 | Numata et al. | 354/23 D |
| 3,971,048 | 7/1976 | Ito et al. | 354/60 L |

FOREIGN PATENT DOCUMENTS

| | | | |
|---|---|---|---|
| 2404204 | 8/1974 | Fed. Rep. of Germany | 354/23 D |
| 2405705 | 8/1974 | Fed. Rep. of Germany | 354/23 D |

*Primary Examiner*—Russell E. Adams
*Attorney, Agent, or Firm*—Lyon & Lyon

[57] ABSTRACT

There is disclosed herein an electronic system and circuits for photographic devices for performing certain photographic calculation and control functions. In an exemplary embodiment, the system is particularly useful for performing metering, calculation and control of shutter timing and/or diaphragm aperture opening for a camera. The system includes a logarithmic converter for converting an electrical signal proportional to light intensity passing through the camera lens from a linear value to a log value, and a calculator responsive thereto and to other input parameters, such as film sensitivity, open aperture, selected aperture and selected shutter speed which, in turn, calculates an appropriate shutter speed and an appropriate aperture. The output of the calculator is connected to a circuit, which includes the log converter in a feedback loop for performing an antilog function and for controlling shutter speed and/or diaphragm aperture. The use of the same log converter for performing log and antilog operations provides compensation for errors inherent in the use of separate conversion circuits and improves accuracy and temperature stability to thereby insure accurate and stable metering. The calculator allows either or both of the shutter speed and diaphragm aperture to be calculated and controlled. In addition, a sample and hold circuit memorizes the exposure value EV to enable either shutter speed or aperture value to be changed while automatically compensating for the other.

33 Claims, 8 Drawing Figures

FIG_1.

FIG_5_

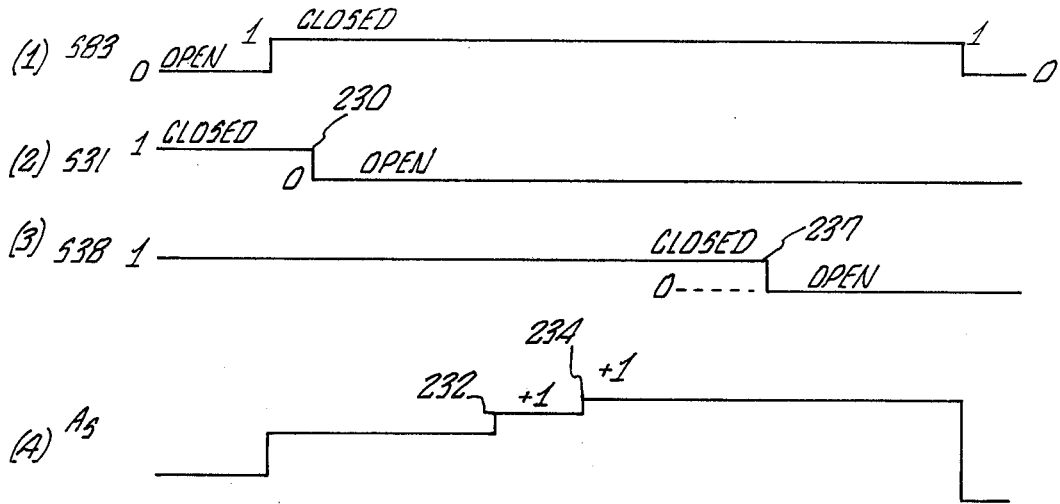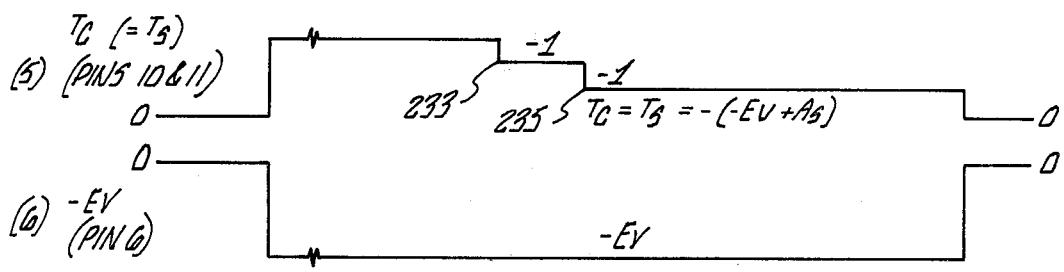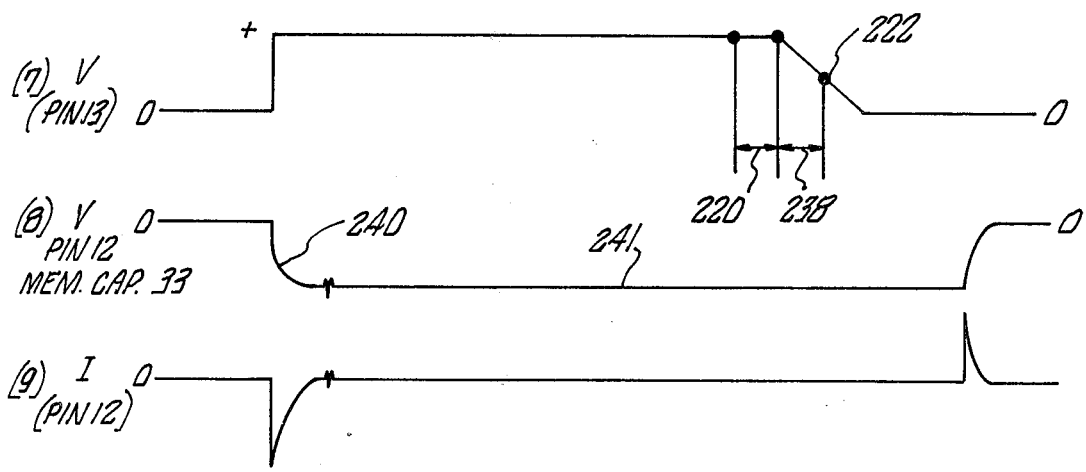
FIG. 6

ELECTRONIC SYSTEM FOR PHOTOGRAPHIC DEVICES

BACKGROUND OF THE INVENTION

The present invention relates to an electronic system for photographic devices, and is particularly applicable to cameras. The system provides metering, calculation and control of shutter speed and/or diaphragm aperture in response to certain input parameters and brightness of received illumination.

While not intending to be limited thereby, the background of the present invention and the concepts of the present invention will be described in the environment of a single lens reflex (SLR) camera. Such cameras typically include an objective lens, or interchangeable objective lenses, and a camera body to which the lens is attached. The camera body houses the film, shutter, and associated viewing optics and electronic control circuits for controlling either the speed of the shutter or the opening or aperture of the diaphragm. The diaphragm (iris) usually is contained within the objective lens assembly.

Various types of cameras of this nature presently are available on the market and typically two types of metering systems are used. One system includes a light sensor mounted in any of various manners behind the objective lens, and an electrical circuit which allows the user to select the appropriate shutter speed and aperture by changing either one or both while watching a meter pointer or other form of indicator in the viewfinder. These types of cameras frequently are referred to as having a "match-needle" exposure system.

Another form of camera of this nature has an "automatic" exposure system and is somewhat similar to the first but is more automatic in that the user selects either the aperture value or the shutter speed, and the other of these two variables is calculated by the electronic circuit and automatically controlled. Of these types of cameras, there is an "aperture-preferred" type wherein the user selects the f/stop, and the electronic system of the camera automatically computes and controls shutter speed, and a "shutter-preferred" type wherein the user selects shutter speed, and the electronic system automatically calculates and selects the appropriate diaphragm aperture value.

Early single lens reflex camera systems used stop-down metering wherein the light metering was performed with the diaphragm aperture set at the selected f/stop to ensure that the electronic circuit received the proper aperture value. This type of system had the disadvantage that the viewing brightness was diminished because the aperture was stopped down. Subsequently, SLR's were developed which allowed preview of the scene, which is going to be photographed, through an open or full aperture, and then metering through the selected stopped-down aperture.

Other types of automatic or semiautomatic cameras are available, many of which preceded the match-needle and automatic SLR's. In some of the former, generally a light sensor senses the incident light while the shutter is open and causes the shutter to close when sufficient light has been received for appropriate exposure of the film. In the typical SLR on the other hand, a hinged mirror is provided between the objective lens and the film plane, and serves to reflect an image of the subject to be photographed to the viewfinder. Then, when the shutter release button is depressed for taking the picture, the mirror flips up thereby allowing light to pass through the objective lens and shutter to the film plane without any obstruction from the mirror. It was readily recognized by those in the photographic field that it was desirable to mount the light sensor in a manner which would not diminish the light reaching the film plane or otherwise obstruct the same. Accordingly, various systems were devised for either placing the light sensor in the viewing optical system following the mirror or providing a movable light sensor so that the same could be moved out of the path of light to the film when the film is being exposed. Examples of these arrangements are shown and described in U.S. Pat. No. 3,442,190 to Erickson.

Inasmuch as it has been desirable to provide metering of the incident light either during exposure or, at least, up to a time immediately preceding exposure, it also was readily apparent to those in the photographic field in designing single lens reflex cameras with either a light sensor in the viewing optics or a moving light sensor as noted above, that some means must be provided for storing an electrical signal proportional to the incident light so that proper exposure control could be accomplished even when the incident light no longer reached the light sensor at the time of exposure. This was readily accomplished by using the known storage or memory ability of a capacitor to receive the signal from the light sensor prior to exposure, to thereby memorize the light value, and then use the charge stored on the capacitor for shutter timing control. Numerous arrangements of this nature are disclosed in the literature, examples being shown in U.S. Pat. No. 3,324,779 and U.S. Pat. No. 3,695,157.

Further, in such systems of the latter type, it has been well established that the influence of the exposure determining factors of film speed (ASA), f/stop, and shutter speed on the exposure of the film varies in accordance with the variation of the exposure determining factors according to a geometrical progression having a common ratio of two. Because of this mathematical relationship, logarithmic circuits for logarithmically compressing and subsequently logarithmically expanding signals were used so that the necessary calculations could be performed with log signals in a relatively simple and straightforward manner. Examples of camera electronic system which describe such logarithmic circuits are found in U.S. Pat. No. 3,690,230 and No. 3,695,157. As explained in these latter two patents, the circuits using logarithmic compression and expansion require extremely complex circuits. In addition, while it is known that logarithmic conversion followed by calculation with the logarithmic signals involves simple addition and subtraction and thus is a desirable approach because the calculations are performed simply in a log scale and the data is compressed reducing the dynamic range requirement of the calculator, such logarithmic compression and expansion circuits can introduce significant errors because of drift, temperature variations, and the like. Furthermore, such prior systems have been limited in their calculation ability to calculate and display the shutter speed value or the diaphragm aperture value, and have been relatively complex because of mixing linear and log signals. Moreover, prior circuits freeze the controlled value (shutter speed or aperture) once the brightness value has been stored, thereby preventing a subsequent change in the control of the preferred value (the other one of shutter speed or aperture).

SUMMARY OF THE INVENTION

The present invention provides an improved form of electronic system and circuits for photographic devices, and is characterized by substantial flexibility in operation and use, but still takes advantage of logarithmic conversion while providing self-compensation of many errors occuring in the conversion process. The system as applied to an SLR camera, for example, allows preview through full or open aperture, and performs appropriate light metering while receiving suitable input parameters to provide calculation and control of the shutter speed and/or diaphragm aperture values.

In an exemplary embodiment, the electronic system of the present system can receive as inputs film sensitivity S, minimum aperture value Amin or Ao (corresponding to fully open lens), maximum aperture value Amax (corresponding to fully closed lens), selected shooting aperture As (corresponding to stop-down lens), and selected shutter speed Ts, and in turn calculates both shutter speed Tc and aperture value Ac, either or both of which may be used in controlling automatically the shutter and/or diaphragm aperture. This form of system readily allows the same to be used in different forms of cameras for calculating the value or values to be controlled as a function of the input parameters and brightness (which is a function of the incident light). This form of system also enables an improved form of display (such as in the viewfinder of the camera) to be provided so as to display both the selected and the calculated values to thereby provide the operator with more information and enable greater flexibility in exposure of the film. Additionally, the system memorizes the exposure value (EV) without fixing or freezing either the shutter speed value or the diaphragm aperture value, thereby allowing the user to still vary either one while automatically and electronically appropriately changing the other after the exposure value is memorized.

Additionally, the electronic system employs a logarithmic converter for simplifying calculation and reducing the dynamic range requirements, but without the typical error and temperature stability problems of prior logarithmic converter systems using a logarithmic compression circuit and a logarithmic expansion circuit. In this regard, the system uses a logarithmic circuit to provide the same log function for converting the incident light signal to a brightness value (Bv) log signal and for generating the antilog control signal for control of the shutter speed value. In this manner, most errors made in the brightness measurement are compensated for in the generation of the control signal.

Accordingly, it is the principal object of the present invention to provide an improved electronic system for photographic devices.

Another object of the present invention is to provide an improved form of calculator system for photographic devices.

An additional object of the present invention is to provide a log conversion system for a photographic device wherein error compensation is provided by using the same log function for log compression as for log expansion.

Another object of the present invention is to provide an improved form of display system for photographic devices.

BRIEF DESCRIPTION OF THE DRAWINGS

The further features and advantages of the present invention will become more apparent through a consideration of the following description of a preferred embodiment, taken in conjunction with the drawings in which:

FIG. 6 is a timing diagram illustrating an alternative form of operation of the system of FIG. 2.

DESCRIPTION OF EXEMPLARY EMBODIMENT

Figure 1:
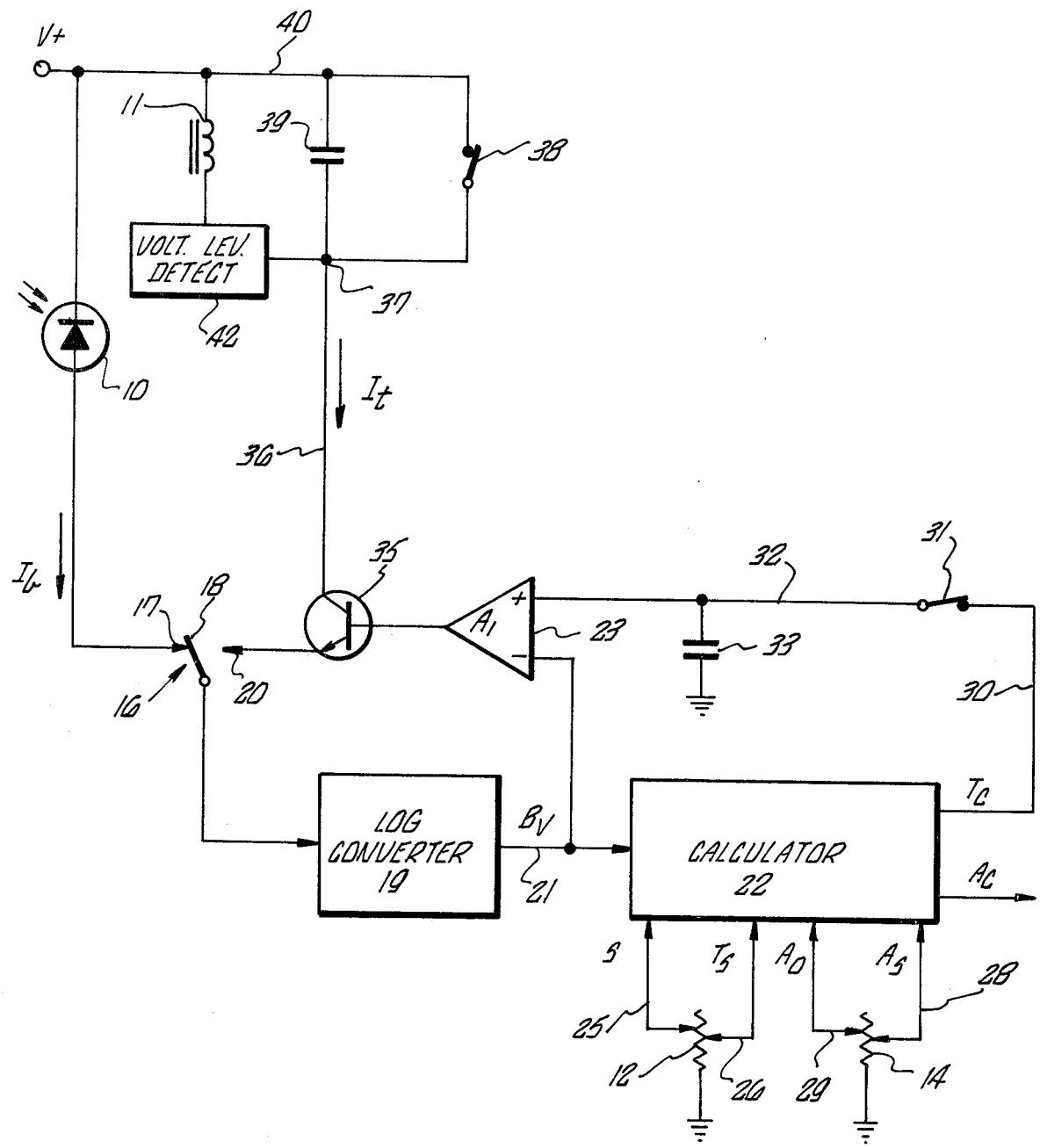
FIG. 1 is a simplified functional diagram of an electronic system according to the present invention.

Turning now to the drawings, and first to FIG. 1, the same is a simplified functional diagram of the electronic system of the present invention. For purposes of description of the system, it will be assumed that the same is used with a single lens reflex camera of the aperture-preferred type, although the system can be operated in a shutter-preferred mode or in a fully automatic mode, as well as in a manual mode. In this exemplary embodiment, a light sensor 10 is located in the camera to receive light passing through the objective lens so as to provide an electrical signal proportional to the brightness on the film plane through the minimum aperture value of the lens (fully open). The camera also includes, as is known, a shutter of any of several types, and typically a focal plane shutter, which is controlled by an electromagnet 11. In addition, the camera includes a film sensitivity dial (S) connected with a potentiometer 12, and a shutter speed dial (Ts) connected with potentiometer 12. Further, the diaphragm system of the camera may include a potentiometer 14 coupled with the f/stop ring and diaphragm for setting the f/stop or diaphragm aperture value (As) and the open aperture value (Ao).

The system of FIG. 1, which typically is contained within the camera body, includes a single pole double throw switch 16 having a fixed contact 17 connected with the light sensor 10 and a movable contact 18 connected as an input to a log converter circuit 19. The switch 16 also includes a fixed contact 20 which will be described later. The output of the log converter 19 is connected by line 21 to the input of an analog or digital calculator 22 and to one input of a differential amplifier 23. The movable arm of the potentiometer 12 is connected by a line 25 as an input to the calculator 22 to provide an input signal S to the calculator, which signal is the logarithmic value of the film sensitivity. Another movable arm of the potentiometer 12 is connected by line 26 as an input to the calculator 22 to provide a signal Ts which is the log value of the selected shutter speed. The right-hand movable arm of the potentiometer 14 is connected by a line 28 as an input to the calculator to provide an input signal As which is the log value of the selected shooting diaphragm aperture. The left-hand arm 29 of the potentiometer 14 provides an input signal Ao to the calculator 22 which is the log value of open lens, or minimum aperture value available of the lens.

The calculator 22 receives the input parameters noted above along with a voltage Bv from the line 21 which is the logarithmic value of the brightness of the scene seen at the film plane through the maximum aperture opening of the lens. The calculator, as will be explained in greater detail subsequently, calculates from these input signals an output signal Ac which is the logarithmic value of the calculated diaphragm aperture value and an output signal Tc which is the calculated logarithmic value of shutter speed.

In the exemplary functional arrangement shown in FIG. 1, the signal Tc is supplied by a line 30 through a single pole single throw switch 31 and a line 32 to a memory capacitor 33 and as the upper input to the amplifier 23. The output of the amplifier 23 is connected to the base of a transistor 35, the emitter of which is connected to the fixed contact 20 of switch 16, and the collector of which is connected by a line 36 to a terminal 37 of a shutter control circuit. The shutter control circuit includes a normally closed switch 38 connected in parallel with a timing capacitor 39 between terminal 37 and a voltage source line 40, to which the upper terminal of the light sensor 10 and the upper terminal of the shutter coil 11 also are connected. A voltage level detector 42 is connected between the terminal 37 and the lower terminal of the shutter magnet 11.

Considering now the operation of the simplified version of the system as shown in FIG. 1, it is assumed that the light sensor 10 is disposed within a single lens reflex camera in a conventional manner to receive incident light passing through the objective lens thereof, and that the electromagnet 11 is arranged to release the second curtain of a conventional type of focal plane shutter. It also is assumed that the arms of potentiometer 12 are coupled with suitable dials on the camera and that the right-hand arm of potentiometer 14 is connected with the diaphragm aperture adjustment ring of the objective lens or of the camera. Initially, the movable arm 18 of the switch 16 is to the left on the fixed contact 17, the switch 31 is closed and the switch 38 is closed. As will appear subsequently, switch 31 is opened when the exposure is to be made, and typically is opened when the hinged mirror of the SLR starts to flip up and is closed when the mirror flips back down. The movable arm 18 of the switch 16 is moved to the fixed contact 20 a short period of time after the switch 31 opens. The switch 38 is opened in response to release of the first curtain of the shutter.

With switch 16 in the position shown in FIG. 1, the same allows current Ib of the light sensor photo diode 10 to enter the logarithmic converter 19, and the converter converts this linear current Ib to an output log value in the form of an output voltage equal to the brightness value Bv. This latter voltage is applied by the line 21 as an input to the calculator 22, which also receives log values of film sensitivity S by line 25 from potentiometer 12, selected shutter speed Ts by line 26 from potentiometer 12, and the selected shooting aperture As and the maximum aperture Ao by respective lines 28 and 29 from the potentiometer 14. From these input parameters, the calculator 22 calculates the proper diaphragm aperture value Ac and the proper shutter speed Tc. In the simplified diagram of FIG. 1, only the calculated shutter speed Tc is used, although the calculated diaphragm aperture value Ac is available for use either in the camera under discussion or for other camera models.

When the shutter release button is depressed for exposing the film, switch 31 opens and a voltage Tc representing the calculated value of shutter speed is held in the memory capacitor 33. The movable contact 18 of the switch 16 then changes to the fixed contact 20 and completes a closed loop feedback circuit including the log converter 19, amplifier 23 and transistor 35. This feedback circuit ensures, over the dynamic range used, that the current through the collector of the transistor 35 is the antilog value of Tc which is held in the memory capacitor 33. It should also be noted that, for purposes of the simplified diagram of FIG. 1, the memory capacitor 33 is shown as storing Tc; whereas, in the preferred implementation the exposure value EV ($EV=Bv+Ao+S$) is stored, from which Tc and Ac are calculated. This will be explained in greater detail subsequently.

Switch 38 then opens in a sequence related to the first curtain of the shutter being released, thereby allowing the timing capacitor 39 to be charged by a linear current It which is proportional to the antilog of the Tc voltage held in the memory capacitor 33. Then, when the voltage across the timing capacitor 39 reaches a preset trigger voltage of the voltage level detector 42, the shutter magnet 11 is either energized or deenergized (depending on the type of focal plane shutter used) to thereby release the second curtain of the shutter.

It will be apparent that the circuit of FIG. 1 implements the basic equation for achieving correct exposure in a camera which is:

$$Bv+Ao+S-A_s=Tc,$$

where Bv is the logarithmic value of the brightness of the scene seen through the maximum aperture value Ao of the lens, S is the logarithmic value of the film sensitivity, $A_s$ is the logarithmic value of the aperture set during the exposure, and Tc is the log value of the shutter time. It will be apparent that through the use of log conversion simple addition and/or subtraction can be performed for providing the output control signals (Tc and/or Ac) as a function of the input parameters (Bv, S, Ts, Ao and As). This is highly desirable because the calculations are performed simply in a log fashion, and the data is compressed thereby reducing the dynamic range requirements of the calculator. Significantly, only one log converter is used to achieve both (1) conversion of the light sensor current Ib to the log value Bv and (2) the antilog conversion of the log value Tc into a linear charging current It which, in conjunction with capacitor 39 and the level detector 42, provides a real time signal for shutter control. Most errors made during the log conversion are partly compensated for automatically by using the log converter for both log operations (log and antilog). Circuit simplicity, compactness and potential cost reduction are enabled by this approach.

Thus, the calculator 22 receives the necessary input parameters, including the brightness value Bv, and calculates both the shutter speed Tc and the diaphragm aperture value Ac, either or both of which may then be used as a control signal. The system uses a logarithmic converter in a manner to enable self-compensation of most errors occurring during the log conversion thereby allowing accurate and stable metering. The calculating circuit continually calculates in any mode of operation what Tc and Ac should be thereby allowing either aperture preferred, shutter preferred, or full automatic operation wherein both the diaphragm aperture and shutter speed are controlled automatically. As will be explained in greater detail later, this system approach allows the memorization of the exposure value EV without fixing or freezing the shutter time value Tc or the diaphragm aperture value Ac, thereby allowing the user to still change either shutter speed or diaphragm aperture regardless of which is the preferred parameter and allow the circuit to calculate the other automatically even after the exposure value is held or memorized. These operations and features will be covered further in a discussion of an exemplary implementation as described below and shown in the other drawings.

Figure 2:
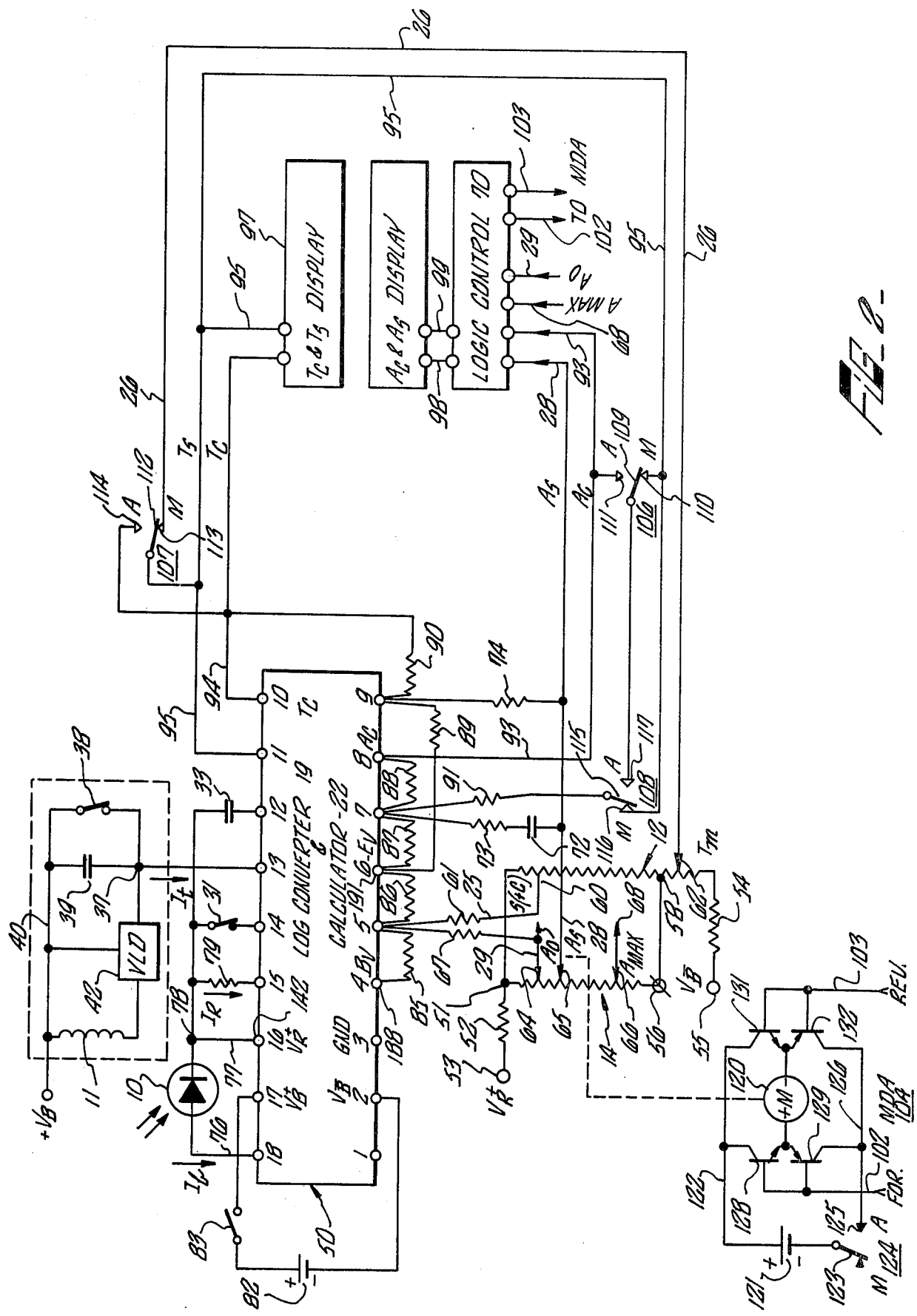
FIG. 2 is a detailed combined block and circuit diagram of an exemplary implementation of a photographic system according to the present invention.
Figure 3:
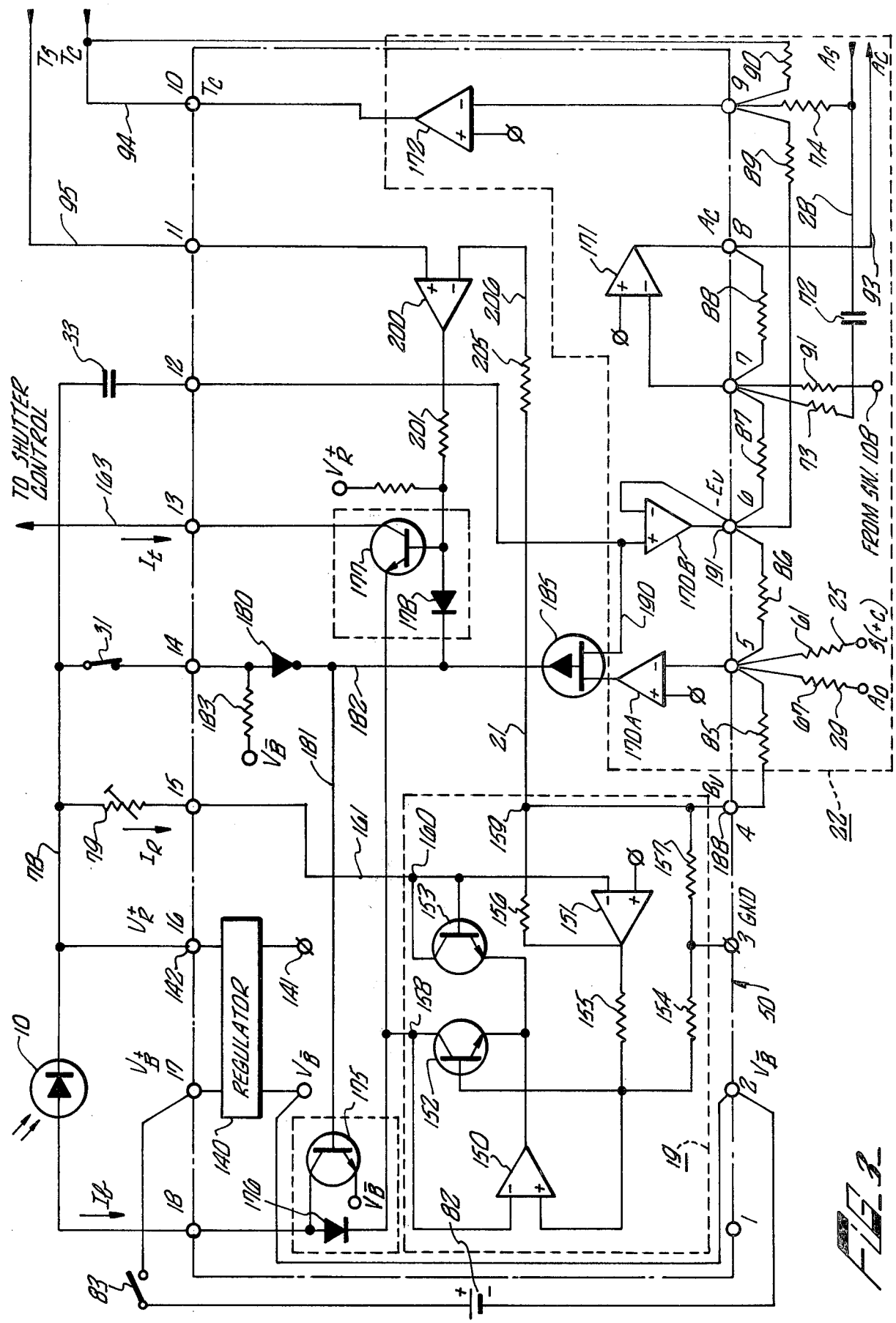
FIG. 3 is a circuit diagram of the calculator portion of the system shown in FIG. 2.
Figure 4:
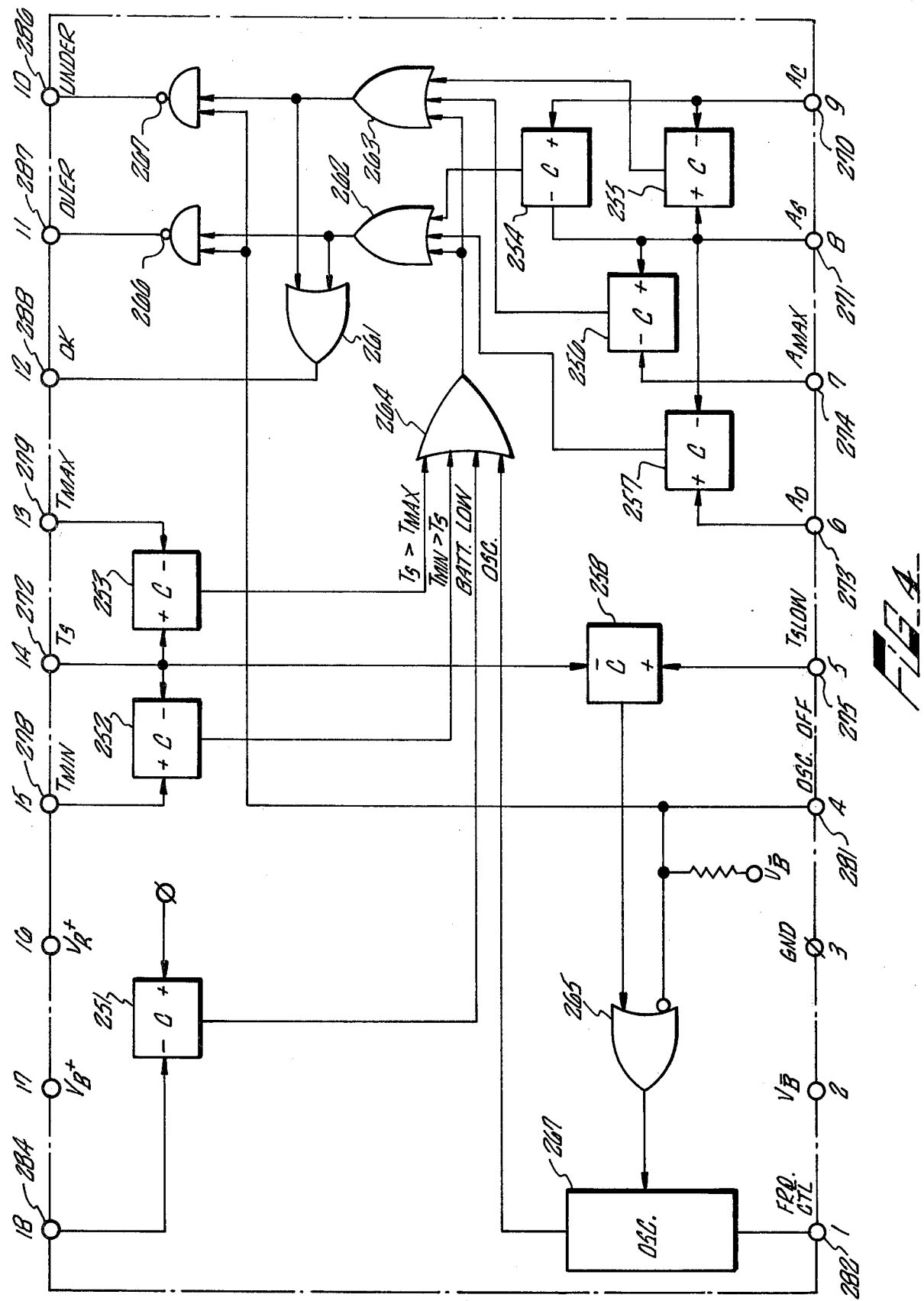
FIG. 4 is a block diagram of the logic control portion of the system of FIG. 2.

Turning now to a description of a preferred embodiment of the present invention, an exemplary system is shown in FIG. 2, and FIGS. 3 and 4 show details of portions of the system of FIG. 2. Like reference numerals are used to designate similar components. In FIG. 2, the log converter 19 and calculator 22 are shown in the form of a single integrated circuit chip 50, and this chip contains other components, such as switches, as will be explained further in the discussion of FIG. 3 which shows the details of the chip 50. The system as shown in FIG. 2 comprises the complete electronics system for a photographic device, such as a single lens reflex camera.

Considering the input controls, the upper terminal of the potentiometer 12 is connected to a terminal 51 which, in turn, is connected through a resistor 52 to a source of reference voltage, +Vr. In a similar manner, the upper terminal of the potentiometer 14 is connected to the terminal 51. The lower terminal of the potentiometer 12 is connected through a resistor 54 to a terminal 55 which, in turn, is connected to a negative voltage source −Vb. The lower terminal of the potentiometer 14 is connected to a ground reference terminal 56, which, in turn, is connected by a line 57 to a tap 58 intermediate the ends of the potentiometer 12. This arrangement of the potentiometers 12 and 14 allows portions of a reference voltage to be picked off by the taps of the potentiometers, and with the same reference voltage Vr used in other portions of the circuit slight changes in the magnitude of this reference voltage do not introduce unacceptable errors. The potentiometers 12 and 14 can be linear but calibrated or graduated in log values.

An upper movable tap 60 of the potentiometer 12 is connected with the line 25 to provide the log signal S which represents film sensitivity. In addition, the film sensitivity scale (e.g., ASA) can be adjusted with respect to the dial on the body of the camera which is connected to the movable tap 60 to, in turn, provide a calibration factor C in the calibration of the system. The line 25 is connected through a resistor 61 to pin number 5 of the log converter and calculator chip 50. A movable tap 62 of the potentiometer 12 provides a log signal representing the manually selected shutter speed or time signal Tm which is applied to line 26. As will be apparent to those skilled in the art, the movable tap 60 is connected to the film sensitivity dial of the camera, and the movable tap 62 is connected to the shutter speed dial of the camera.

In a similar manner, the potentiometer 14 includes three movable taps 64 through 66. The movable tap 64 is connected by the line 29 through a resistor 67 to pin number 5 of chip 50. The tap 64 provides a signal representing the log value of the open aperture value Ao (generally referred to as Amin in the Apex system of designation, and corresponds to a fully open lens), The movable tap 65 is connected to the line 28 and provides a log signal representing the selected shooting aperture As. The movable tap 66 is connected to a line 68 and provides a log signal representing maximum aperture value Amax (which is the smallest lens opening or fully closed lens). Assuming, for example, an objective lens having an aperture range of f2.8 to f22, the open aperture Ao (called Amin in the Apex system) is f2.8; whereas, Amax is f22 in the Apex system. Both of these values are fixed for any given objective lens; whereas, the selected aperture As is variable by the user by varying the f/stop ring to change the iris diaphragm. Thus, the Ao and Amax values of the objective lens used at any given time are set upon coupling the objective lens to the camera body, and the selected diaphragm As is varied as desired by the user or by a servo motor.

The open aperture value Ao line 29 also is connected to a logic control circuit 70, as is the Amax line 68, for purposes which will be described subsequently. The Ao line 28 also is connected through a capacitor 72 and resistor 73 to pin number 7 of the chip 50, and through resistor 74 to pin number 9 of chip 50.

The log converter 19 and calculator 22 chip 50 also has connected thereto the light sensor 10 which preferably is a silicon photo diode. The anode is connected by a line 76 to pin number 18 of the chip 50, and the cathode thereof is connected by a line 77 to pin number 16 of the chip 50, pin number 16 being at the reference voltage, +Vr. Thus, line 77 and line 78 are at the reference voltage +Vr. A calibration adjustment potentiometer 79 is connected between the line 78 and pin number 15 of the chip. Switch 31 similarly is connected between the line 78 and pin number 14 of the chip 50, and capacitor 33 is connected between the line 78 and pin number 12. A dc voltage source 82 within the range of approximately 3 to 10 volts, and preferably approximately 6 volts is connected between pin number 2 of the chip 50 and through a switch 83 to pin number 17 of the chip 50. Resistors 85 through 90 are connected with various of the pins 4 through 10 of the chip 50 and form a part of the calculator 22 portion of the chip, along with resistors 61, 67, 73, 74 and 91 as will be explained in more detail in the discussion of FIG. 3. Pin number 8 of the chip 50 provides as an output the computed aperture value Ac on a line 93, and from pin number 10 the compound value of shutter time Tc on a line 94. The selected shutter speed Ts is applied on a line 95 as an input to pin number 11 of the chip 50. The lines 94 and 95 are connected to a display 97 for display of the calculated and selected shutter speeds Tc and Ts, respectively. Lines 28 and 93 which supply As and Ac are connected to the logic control 70, and this control is in turn connected by lines 98 and 99 to a display 100 for displaying the selected and calculated diaphragm aperture values As and Ac, respectively. The logic control circuit 70 also receives inputs on lines 29 and 68 from respective movable taps 64 and 66 of potentiometer 14 representing Ao and Amax. The logic control circuit 70 provides outputs on lines 102 and 103 to a motor drive amplifier 104 for controlling the iris diaphragm and thereby As as will be explained subsequently.

The system of FIG. 2 also includes three switches 106 through 108 for selecting four modes of operation of the system; namely, manual, automatic timer ("aperture-preferred"), automatic aperture ("shutter-preferred"), and full automatic. Each of these switches has a movable arm and two fixed contacts. Thus, switch 106 has a movable arm 109 and fixed contacts 110-111, switch 107 has movable arm 112 and fixed contacts 113-114, and switch 108 has movable contact 115 and fixed contacts 116-117. Fixed contacts 110, 113 and 116 provide "manual" operation (when the respective movable contact 109, 112 or 115 engages the same), and fixed contacts 111, 114, and 117 provide "automatic" operation. The movable contacts 109 and 112 of respective switches 106 and 107 may be ganged together so as to operate together.

In order to select the manual mode of operation, which allows the operator to select both the desired aperture value As and the shutter speed Ts, the switches 106 through 108 are switched to the manual mode; that is, movable contact 109 is switched to fixed contact 110, movable contact 112 is switched to fixed contact 113, and movable contact 115 is switched to fixed contact 116. In this case, the calculated aperture value $Ac = EV - Ts$ (the aperture to be used with shutter time Ts), and the calculated shutter time $Tc = EV - As$ (the shutter time to be used with the aperture As).

In order to select the auto timer mode ("aperture-preferred") switches 106 and 107 are switched to the automatic position and switch 108 is switched to the manual position; that is, movable contact 109 is connected with fixed contact 111, movable contact 112 is connected with fixed contact 114, and movable contact 115 is connected with fixed contact 116. In this mode of operation, the equations for Ac and Tc are the same as for the manual mode of operation, but $Ts = Tc$ automatically (i.e., the system automatically calculates and controls Tc).

In order to select the automatic aperture mode of operation ("shutter-preferred"), switches 106 and 107 are switched to the manual mode, and switch 108 is switched to the automatic mode. The equations for Ac and Tc are the same as for the manual mode, but $As = Ac$ (i.e., Ac is automatically calculated and used to control the motor drive amplifier 104 which, in turn, sets the iris diaphragm as necessary to cause As to equal Ac).

Finally, in the full automatic mode of operation, all of the switches 106 through 108 are switched to the automatic mode, and in this case $As = Ac = K \, EV$ and $Ts = Tc = EV - As$, where K is a selectable value and is 0.5 in the system of FIG. 2. The manner in which K is determined will be discussed later. Thus, As and Ac are preprogrammed (at the value of KEV by circuit constants), and Tc is calculated the same as in the auto timer mode and used to control the shutter speed. As will be explained in greater detail later, EV is a function of Bv, film sensitivity S and aperture value Ao. The constant K can be selected to be any value in the design of the system merely by selecting resistors or resistor values. It will be seen that in the full automatic mode of operation, resistor 91 is connected in parallel with resistor 88 across pin numbers 7 and 8 of the chip 50 when the switches 106 and 108 are switched to the automatic mode position (movable contact 109 on fixed 111, and movable contact 115 on fixed contact 117).

As noted earlier, the iris diaphragm can be controlled by the computed aperture value Ac through the motor drive amplifier 104. This amplifier includes a motor 120 mechanically connected with the movable tap 65 (As) of potentiometer 14 and the iris diaphragm. Control signals on lines 102 and 103 from the logic control circuit 70 control the direction of rotation of the motor 120 to cause the iris diaphragm to be moved to the calculated value when in the automatic aperture ("shutter-preferred") and full automatic modes of operation. The amplifier 104 includes a power source 121 connected to line 122 and a movable contact 123 of a switch 124. This switch 124 has a fixed contact 125 representing the automatic mode of operation, and the movable arm 123 preferably is coupled with the movable arm 115 of switch 108. The fixed contact 125 is connected to a line 126. A first pair of transistors 128-129 are connected in series between the lines 122 and 126, and have their bases connected to control input line 102. A second pair of transistors 131-132 are connected in series across the lines 122 and 126, and have their bases connected with control input line 103. One side of the motor 120 is connected between the transistors 128-129, and the other side of the motor is connected between the transistors 131-132. A signal on the input line 102 causes the motor 120 to turn in one direction, and a signal on the input line 103 causes the motor 120 to turn in the reverse direction. Rotation of the motor likewise changes the position of the movable tap 65 (As) and, since the motor and motor drive amplifier are in a servo loop, the diaphragm and tap 65 are moved until $As = Ac$.

From the foregoing, it should be apparent that the system of FIG. 2 receives inputs of Bv which is a function of the light striking the light sensor 10, Ao, Amin, As, film sensitivity S and Ts, and calculates shutter time Tc and aperture value Ac. Depending upon the mode of operation, the user can select both Ts and As (manual mode), select the aperture for "aperture-preferred" operation in which shutter time is automatically controlled (auto timer mode), select shutter speed for "shutter-preferred" operation (auto aperture mode), or select a fully automatic mode of operation wherein both the shutter speed and aperture value are automatically controlled. The values Ts, Tc, As and Ac can be displayed by the displays 97 and 100 in any suitable manner, as by galvanometers. These displays may be disposed so that they are viewable in the viewfinder of the camera. The discussion will now turn to a more comprehensive description of the log converter, and calculator and switching therefor, as shown in FIG. 3.

FIG. 3 illustrates the chip 50 for the log converter 19 and calculator 22, and switching circuitry used therewith, as well as several of the components shown in the system diagram of FIG. 2. Again, like reference numerals are used to designate like components. As noted in the discussion of FIG. 2, the dc voltage source 82 is connected to pin number 2 of the chip 50 and through a switch 83 to pin number 17 of the chip 50. Pin number 2 provides −Vb which, for example, may be −1.3 volts dc. Pin number 17 is +Vb which, for example, may be +4.7 volts. A voltage regulator 140 is provided and is connected between pin number 17 of chip 50 (+Vb) and pin number 2 (−Vb) as shown, and has an output ground terminal 141 and a reference voltage output 142 (+Vr) connected to pin number 16 of the chip 50. A typical voltage for +Vr is +1.2 volts, regulated. The symbol used for the ground terminal 141 is used for other terminals within the diagrams of FIGS. 3 and 4, and in each case represents ground. Thus, for example, pin number 3 of the chip 50 is a ground terminal (at zero volts). The similarly labeled voltage and ground terminals of FIG. 2 correspond to those of FIGS. 3 and 4.

The log converter 19 includes amplifiers 150 and 151, transistors 152 and 153, and associated resistors 154 through 157. A junction 158 at the collector of transistor 152 is the Ib input to the log converter 19, and junction 159 (between resistors 156–157 and connected to pin number 4 of chip 50) is the Bv output of the log converter 19. A junction 160 at the collector of the second transistor 153 is a reference current Ir input to the log converter and is connected by a line 161 with the potentiometer 79. The potentiometer 79 allows the reference current Ir to be adjusted for calibration of the system. It adjusts the magnitude of current through the second transistor 153 to a desired value. For example, it can be adjusted to cause Ib to equal Ir so as to provide an output of zero volts at the output junction 159 of the log converter. Alternatively and preferably, it can be calibrated to calibrate the shutter timer during the shutter control phase of operation (as distinguished from the preceding light metering phase of operation) to cause the shutter control current It on a line 163 (pin number 13 of chip 50) to equal Ir to obtain a zero volt output at output junction 159 (also pin number 4 of chip 50) of log converter 19. The switching operations performed in the circuit of FIG. 3 will be described later.

The calculator 22 portion of the circuit of FIG. 3 includes an amplifier 170A-B having two stages as shown, and amplifiers 171 and 172. The calculator also includes resistors 61, 67, 73, 74, and 85–91 previously described in connection with the description of FIG. 2.

The circuit of FIG. 3 includes a first switch comprising a transistor 175 and a diode 176, and this switch performs the function of the fixed contact 17 and movable contact 18 of switch 16 of FIG. 1 to apply the photo diode current Ib to the log converter 19. This current Ib, as will be described further, flows through the first transistor 152 of the log converter 19. A second switch comprising a transistor 177 and a diode 178 is provided, and serves the function of the movable contact 18 and fixed contact 20 of switch 16 of FIG. 1, as well as the function of transistor 35 of FIG. 1. The switch passes the shutter timer current It through the first transistor 152 of the log converter 19 and controls the magnitude of It. These two switches are controlled from the switch 31 which is connected from the $+Vr$ reference voltage line 78 to the input of a logic inverter amplifier 180. The output of the amplifier 180 is connected by a line 181 to the base of the transistor 175, and by a line 182 to the cathode of the diode 178. A pull-down resistor 183 for the input of the amplifier 180 is connected between the input of this amplifier and $-Vb$. When the switch 31 is closed, $+Vr$ appears at the input of the inverting amplifier 180, and a similar but negative voltage appears at the output of this amplifier. When the switch 31 is open, $-Vb$ is applied to the input of the amplifier 180 and a similar but positive voltage appears at the output thereof. The output voltages of the amplifier 180 control the states of these two switches, as well as the state of a field effect transistor switch 185 which forms, in conjunction with the memory capacitor 33, a sample and hold circuit for holding the exposure value EV when the switch 31 is open.

In the operation of the circuit of FIG. 3, the main switch 83 connected with the dc power source 82 typically is closed upon partial depression of the shutter release button of the camera to apply power to the system. The switch 31 is closed at this time, and the output of the inverting amplifier 180 applies a negative voltage to the base of the transistor 175. This turns off the transistor 175 thereby allowing the current Ib from the light sensor 10 to flow through the diode 176 and into the collector-emitter path of the first transistor 152 of the log converter 19. At this time, with the negative output from the inverting amplifier 180, the transistor 177 is off and the shutter timer current It cannot flow to the transistor 152 of the log converter 19. Also at this time, the reference current Ir flows through the line 161 and the collector-emitter path of the second transistor 153 of the log converter 19. The log converter 19 provides an output voltage at junction 159 which is applied to pin number 4 of the chip 50, and labeled as terminal 188, and this voltage is equal to the log value of the current Ib through the first transistor 152 divided by the reference current Ir through the second transistor 153 (that is, the ratio of Ib to Ir). The reference current Ir is constant inasmuch as the same is set by the variable resistor 79.

Additionally, while switch 31 is closed, the FET switch 185 is on (closed). The voltage Bv is applied through resistor 85 to the minus input of amplifier 170A of the calculator 22 portion of the circuit of FIG. 3. Also applied to this input of this amplifier 170A is the log value of Ao through resistor 67 and the log value of S (plus a calibration factor C) through resistor 61. The closed resistance of the FET 185 is low and the output impedance of the amplifier 170A is low and therefore a power source is provided at the output of this amplifier for rapidly charging the capacitor 33. As can be seen from FIG. 3, the output of the amplifier 170A is connected through the closed FET 185 and line 190 to the capacitor 33. This line is also connected to the plus input of the amplifier 170B which is a unity gain amplifier, with high input impedance to minimize leakage of the charge from capacitor 33. The output of amplifier 170B appears at pin number 6 of chip 50, identified as terminal 191, and this output is a voltage $-EV=-(Bv+Ao+S+C)$. The resistor 86 provides feedback from the output of amplifier 170B to the minus input of the amplifier 170A. The exposure value signal $-EV$ at terminal 191 (pin 6) is applied through a resistor 87 to the minus input of the amplifier 171 for calculation of Ac, and through the resistor 89 to the minus input of the amplifier 172 for calculation of Tc. As will be explained shortly, when the switch 31 is opened, the FET 185 goes off so that the exposure value $-EV$ is stored and available at terminal 191 for continuing calculation of Ac and Tc in the event As and/or Ts are changed by the operator.

The selected aperture value As is applied by line 28, capacitor 72 and resistor 73 to the minus input of the amplifier 171. This input is for servo correction purposes and provides the first derivative of speed of iris diaphragm motor 120 (FIG. 2). Another input, depending upon the position of switch 108 in FIG. 2, is applied through the resistor 91 to the minus input of the amplifier 171. The output of the amplifier 171 is $Ac=EV-Ts$ and is applied to output line 93, and fed back through resistor 88 to the minus input of this amplifier.

In addition to the exposure value $-EV$ applied to the minus input of the amplifier 172, the selected aperture value As is applied through line 28 and resistor 74 to this input, as is the calculated shutter time Tc through resistor 90. The output of the amplifier 172 appears on output line 94 from pin number 10 of the chip 50 and is $Tc=EV-As$.

From the description thus far, it should be apparent that the light through the objective lens received by the light sensor diode 10 results in a current Ib. With the switch 31 closed, this current is applied through the diode 176 and through the collector-emitter path of the first transistor 152 of the log converter 19. A reference current Ir flows through the collector-emitter path of the second transistor 153 of the log converter 19, and the log converter provides an output at terminal 188 which is a voltage Bv representing the ratio of Ib to Ir. This is a log voltage Bv and is applied to the calculator 22 as an input to the amplifier 170A. The calculator also receives the log value of open aperture Ao and the log value of film sensitivity S (as well as the log value of the calibration factor C discussed in the description of FIG. 2) and the capacitor 33 charges. The output of the amplifier 170B at terminal 191 is the exposure value −EV, and EV is memorized or stored when switch 31 opens. From the exposure value EV, the calculated shutter time Tc and the calculated aperture value Ac are computed in the calculator 22 in the manner described above. In the manual mode of operation, $Ac = EV - Ts$ and $Tc = EV - As$. In the auto timer mode, which is an aperture-preferred mode, switches 106–107 are in automatic and switches 108 and 124 are in manual and Tc is caused to be equal to Ts since the movable contact 112 of switch 107 is connected with fixed contact 114 thereby directly connecting Ts line 95 with Tc line 94 (note FIG. 2). The signal $Ts = Tc$ is applied by line 95 (FIG. 2) through fixed contact 116 and movable contact 115 of switch 108 and through resistor 91 to the minus input of amplifier 171 (see FIG. 3) of the calculator. The aperture is as selected by the user (As) and shutter time is automatically controlled. The reverse operation occurs in the automatic aperture mode (shutter-preferred). Switches 106–107 are in manual, and switches 108 and 124 are in automatic. The manually selected shutter time Tm is used as Ts and is applied through line 26, switch 107, line 95, switch 106 (109–110), switch 108 (117, 115) and resistor 91 to the minus input of amplifier 171. The computed shutter time Tc is not applied through switch 107 (112 and 114 not connected in manual) and resistor 90 to the minus input of amplifier 172 in this case. The proper aperture value Ac is calculated and causes, through logic control circuit 70, the motor drive amplifier 104 and motor 120 to move the iris diaphragm to the proper value therefore making As equal to Ac automatically.

In the full automatic mode, switches 106–108 and 124 are in the auto mode. Inasmuch as there are many combinations of Tc and Ac in this mode of operation, a constant K is preprogrammed into the system to cause $As = Ac = KEV$. In this mode of operation, the selected shutter speed Ts is not applied through resistor 91 as an input to the minus input of the amplifier 171 because both of the switches 106 and 108 are in the auto mode (movable contact 109 engaging fixed contact 111, and movable contact 115 engaging fixed contact 117). Resistor 91 is connected in parallel with resistor 88 by the switches 106 and 108 thereby dividing in half the feedback resistance from the output of amplifier 171 to the minus input thereof since the values of these resistors preferably are equal (the resistors 61, 67, 73, 74 and 85–91 preferably equal and one hundred thousand ohms each). The amplifier 171 is, thus, connected in such a manner that its output Ac is equal to $$\frac{\frac{R88 \times R91}{R88 + R91}}{R87} \times EV$$

With $R87 = R88 = R91$, then $Ac = 0.5\ EV$ (and K is 0.5). Since the servo motor 120 is operated in this mode, As will be made equal to Ac which, in turn, is equal to 0.5EV. Since the amplifier 172 of the calculator calculates $Tc = EV - As$, and $Tc = Ts$ (because switch 107 is in the auto mode with movable contact 112 engaging fixed contact 114) the shutter time will be controlled in a manner similar to the auto timer mode. Even in the event As is not equal to Ac, the exposure will be correct because Tc will be in accordance with EV and As. The factor K can be preselected by using a different resistor ratio to preprogram Ac versus EV in the design or initial set-up of the camera electronic system, or could be variable by the user.

Figure 5:
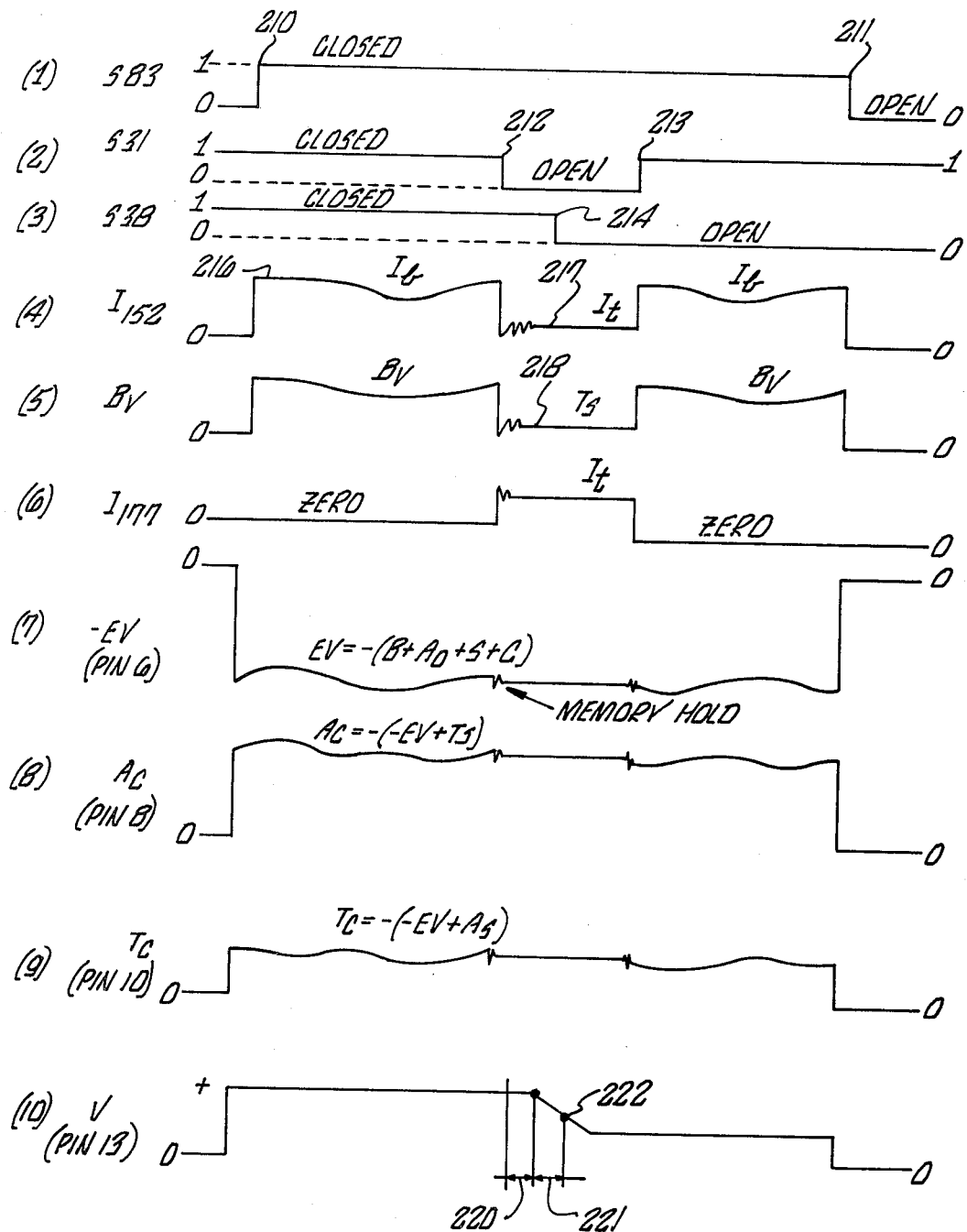
FIG. 5 is a timing diagram illustrating an exemplary sequence of operation of the system of FIG. 2.

The foregoing explains the manner in which the incident light is metered, Bv is developed and the exposure value EV is stored or memorized thereby enabling automatic calculation of either or both of Tc and Ac. The waveforms of FIG. 5 illustrates an exemplary complete cycle. The reference in FIG. 5 to pins mean the pins of chip 50. Assuming that the incident light has been measured and EV stored, the switch 31 is opened typically when the mirror of the SLR starts to hinge up. For example, it is opened just before shooting when the mirror is still down (just before the mirror is hinged up) and the iris diaphragm is still fully open. The switch 31 thus can be opened by the shutter trigger mechanism, such as upon further depression of the shutter release button. It also can be opened mechanically by a separate "memory hold" button for reasons which will be described later. When the switch 31 is opened, −Vb is applied to the input of the inverting amplifier 180 and the output of this amplifier is positive. This causes the transistor switch 175 to turn on and effectively back bias the diode 176. The photo diode current Ib flows through the transistor 175 to −Vb rather than to the log converter 19. This positive output of amplifier 18 also back biases diode 178 thereby allowing the output of a differential amplifier 200 to drive the base of the transistor 177 through a resistor 201 to thereby control the current It through the collector-emitter path of the transistor 177. The shutter timer current It thus is applied through the collector-emitter path of the first transistor 152 in the log converter 19. At this time, the FET transistor 185 is off to hold the exposure value −EV at the output terminal 191 of amplifier 170B. It is preferable that the transistor 185 be turned off before transistors 175 and 177 are turned on. This can be accomplished by providing a suitable delay within the integrated circuit chip 50, although the circuit is suitably operable without such time delay because the time constant of the memory circuit (capacitor 33 and amplifier 170B) is such that the capacitor loses very little charge in the small time (microseconds) required to switch the switches 175, 177 and 185.

The shutter timer current It now flows through transistor 177 into the log converter 19, and the magnitude of this current is controlled by the transistor 177 from the differential amplifier 200. The differential amplifier 200 receives Ts as an input from line 95, and receives the output of the log converter 19 through line 21, resistor 205 and line 206. If, for example, the magnitude of It is too high as compared to Ts by the differential amplifier 200, the log value also is too high, and the differential amplifier 200 corrects the samx by varying the bias on the base of transistor 177. In this manner, the antilog operation is performed with the same log converter 19 to provide a linear shutter timer current It and to control that current so as to provide a proper exposure of the film. As explained earlier in the description of FIG. 1, the switch 38 (FIGS. 1 and 2) in the shutter control circuit is opened when the first cur ain of the shutter is released (to initiate the exposure of the film). The second curtain of the shutter is released (to terminate the exposure of the film) when the voltage at the junction 37 reaches the level to cause the voltage level detector 42 to control (either energize or deenergize, depending upon the particular type of shutter system) the shutter electromagnet 11.

The timing diagram of FIG. 5 illustrates an exemplary operation of the system of FIGS. 2-3. The upper three curves illustrate the open and closed positions of the power switch 83, memory switch 31 and first shutter curtain switch 38. As to switch 83, the same can be closed as indicated at 210 upon partial depression of the shutter release button and reopened at 211 after full depression and return of the shutter release button. The memory switch 31 is opened at 212 just prior to or when the mirror starts to flip up, and is again closed at 213 when the mirror flips back down. The shutter switch 38 is opened at 214 when the first curtain of the shutter is released.

The fourth curve in FIG. 5 illustrates I152 which is the current through the first transistor 152 of the log converter 19. The portion 216 of this curve illustrates scene brightness variations. In the period 217 this curve represents shutter timer current It. The fifth curve illustrates the voltage Bv at terminal 188 of FIG. 3 (pin number 4 of chip 50). The portion 218 of this curve represents shutter time Ts during the timing sequence of operation since the voltage at terminal 188 is equal to the voltage on line 95 at the positive input of differential amplifier 200 because of the closed loop including the log converter 19 (the minus input of differential amplifier 200 is caused to equal the plus input thereof). The sixth curve in FIG. 5 illustrates the current It through the collector-emitter path of the transistor 177. The seventh curve illustrates the voltage EV at terminal 191 (pin 6 of chip 50), and the eighth and ninth curves respectively illustrate the voltages Ac and Tc. The tenth curve illustrates the voltage on the collector of the transistor 177 (pin 13 of chip 50), and portion 220 indicates the mirror flip-up and aperture stop-down, portion 221 illustrates the shutter open time, and point 222 indicates the point at which the second curtain of the shutter is released when the voltage level detector 42 switches the shutter electromagnet 11.

The timing diagram of FIG. 6 illustrates an operation of the system of FIGS. 2-3 which is possible because of the storage of the exposure value EV, and which allows the user of the camera to manually change the aperture (or the shutter speed) and then to continue to automatically calculate the shutter speed (or the aperture) after EV is stored. In this case, switch 83 and switch 38 operate as before, and switch 38 causes the first curtain of the shutter to release upon predetermined depression of the shutter release button. However, the memory switch 31 is caused to open before exposure of the film by either a manual "memory hold" button on the camera controllable by the user, or upon predetermined depression of the shutter release button while the mirror is still down, iris diaphragm still fully open and switch 38 still closed (for example, the shutter release button during depression thereof could first close switch 83, then open switch 31, and subsequently open switch 38). In the auto timer, or aperture-preferred, mode of operation as shown in FIG. 6, the exposure value EV is computed and then stored when the memory switch 31 is opened at 230. The user can then change the selected aperture value As as illustrated at 232 in the fourth curve, and Tc (which is equal to Ts in this mode of operation) will be automatically corrected as indicated at 233 in the fifth curve since the exposure value EV remains stored as shown in the sixth curve. If desired, the operator can again change As as indicated at 234 in the fourth curve, resulting in an automatic change in Tc as indicated at 235 in the fifth curve. Ultimately, the shutter release button may be fully depressed, thereby releasing the mirror up, stopping the lens down, and opening the shutter switch 38 as indicated at 237 in the third curve and release the first curtain of the shutter, and Tc automatically controls the shutter open time as indicated at 238 in the seventh curve. The eighth curve indicates at 240 the setting time (such as approximately one millisecond) of the memory capacitor 33 and the subsequent holding time 241 which may be several minutes while still providing exposure accuracy within one f/stop. This feature allows the operator to change the aperture as desired while in the process of taking a photograph and with the shutter time being automatically computed. The same operation can be performed in the automatic aperture, or shutter-preferred, mode of operation to allow the shutter speed to be changed as desired and the aperture value to be automatically computed.

FIG. 4 illustrates an exemplary circuit for the logic control 70. This circuit functions to provide signals to the motor drive amplifier 104 for control of the servo motor 120 in positioning of the iris diaphragm of the objective lens and positioning of the movable tap 65 (As) of the potentiometer 14 in FIG. 2. It also functions to provide suitable signals to the display 100 for providing a display of aperture information. It is a logic circuit containing eight voltage comparators 251 through 258, seven gates 261 through 265, and an oscillator 267. As will be explained below, the circuit of FIG. 4 provides two outputs from gates 266 and 267 to control the motor drive amplifier 104, provides outputs from the gates 261, 266 and 267 to drive suitable indicators. If indicator bulbs are used, the oscillator 267 is provided to cause an indicator to blink under certain conditions.

The logic circuit of FIG. 4 receives several variable inputs and several fixed inputs. The principal variable inputs are the calculated aperture value Ac at input terminal 270, the selected aperture value As at input terminal 271, and the selected shuttertime Ts at input terminal 272. The principal fixed inputs are the open aperture value Ao at input terminal 273, Amax at input terminal 274, Tslow at input terminal 275, Tmin at input terminal 278, and Tmax at input terminal 279. As previously explained, Ac at input terminal 270 is the calculated aperture value, As at input terminal 271 is the selected aperture value, and Ts at input terminal 272 is the selected shutter speed. Ao at input terminal 273 is the minimum aperture value (according to the Apex system) such as f2.8, and Amax is the maximum aperture value, such as f22. These two inputs are fixed voltage levels depending upon the objective lens being used. Tmin at input terminal 278 is a voltage which represents the slowest shutter time, such as one second. Tmax at input terminal 279 is a voltage level representing the fastest shutter speed, such as one thousandth of a second. Thus, Tmin and Tmax are fixed voltage levels depending upon the speed characteristics of the shutter used in the camera. Tslow at input terminal 275 is a fixed voltage level used to represent the typical slowest shutter speed, such as one thirtieth of a second, to be used in a handheld operation (without a tripod). Other inputs include an oscillator off input terminal 281. A positive voltage level applied to this terminal turns off the oscillator 267. An example of a function of this input is to provide an indication that the shutter is open, in which case a negative signal is applied to terminal 281 to cause the oscillator to turn on and thereby cause a blinking indicating to occur. A frequency control input is applied to terminal 282 to control either the frequency and/or duty cycle of the oscillator 267 so as to provide external control over the nature of the blinking indicator. A terminal 284 provides a battery voltage input to enable low battery voltage to be detected and indicated. Other inputs shown diagrammatically are the voltage source inputs, but their connections to the various components are not illustrated so as to minimize confusion in the understanding of the logic system of FIG. 4.

Output terminals 286 through 288 may be used to drive suitable indicators (lamps, meters or the like). Output terminal 286 provides an indication that the film will be "under" exposed which occurs when As is greater than Ac (a minus output at terminal 286). Output terminal 287 provides an "over" exposure indication when Ac is greater than As (a minus output). Output terminal 288 provides an "okay" indication (minus) only if both the over and under indications are not present.

The comparator 251 receives the battery voltage input from terminal 284 and compares the same to reference ground. This comparator provides a positive output if the battery voltage is low. This positive output passes through the OR gate 264 and the OR gates 262–263 to the respective Nand gates 266–267 which, in turn, provide negative outputs to activate both the over and under indicators. When both of these indicators are activated, it signals that a limit or error condition exists (in this case, the battery voltage is too low). The comparator 252 receives the Ts input from terminal 272 and the Tmin from terminal 278 and provides a positive output when Ts is smaller than Tmin to indicate that the selected shutter speed is outside the range of the shutter. Similarly, Ts and Tmax are applied to comparator 253 which provides a positive output when Ts is greater than Tmax, thereby indicating that Ts is outside the range of the shutter. The comparator 258 also receives a Ts input along with the Tslow input from terminal 275. This comparator provides a positive output if Ts is smaller than Tslow to turn on the oscillator through OR gate 265 to thereby provide a blinking indication for signalling to the operator that a tripod should be used. The output of the oscillator 267 is applied through the OR gate 264, the OR gates 262–263 and the Nand gates 266–267 (which invert the positive inputs to negative outputs) to provide over, under and okay signals which are blinking under control of the oscillator.

The comparator 254 receives inputs Ac and As and provides a positive output when Ac is greater than As. This output is applied through the OR gate 262 and inverted by the Nand gate 266 to provide an over indication at output terminal 287. Similarly, comparator 255 receives Ac and As, but provides a positive output when As is greater than Ac which, in turn, causes an under indication from output terminal 286. When Ac is equal to As, the okay indication from terminal 288 occurs. In a similar manner, comparator 256 provides a positive output when As is greater than Amax, and comparator 257 provides a positive output when As is smaller than Ao to provide suitable indications of these conditions.

Figure 7A:
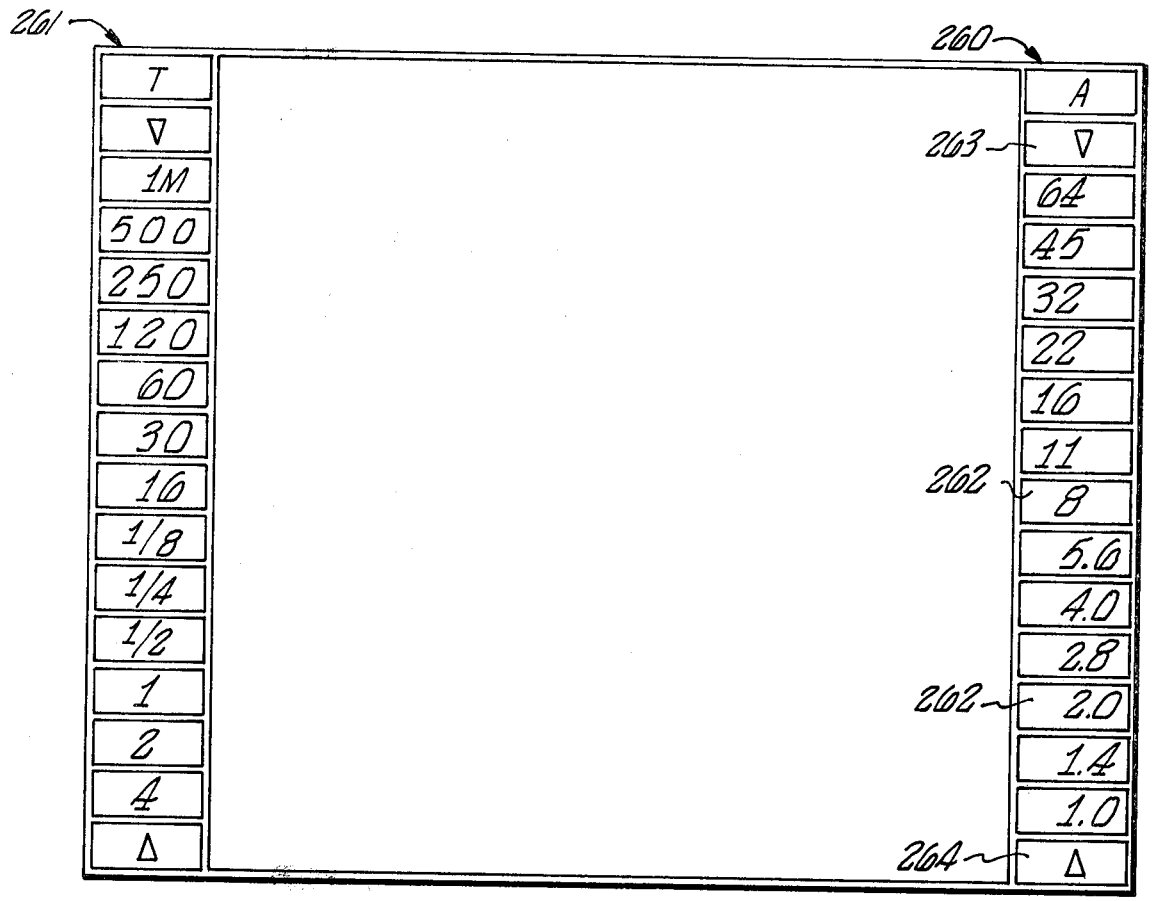
FIG. 7a and 7b are an alternative display and a block diagram of a control system therefor.
Figure 7B:
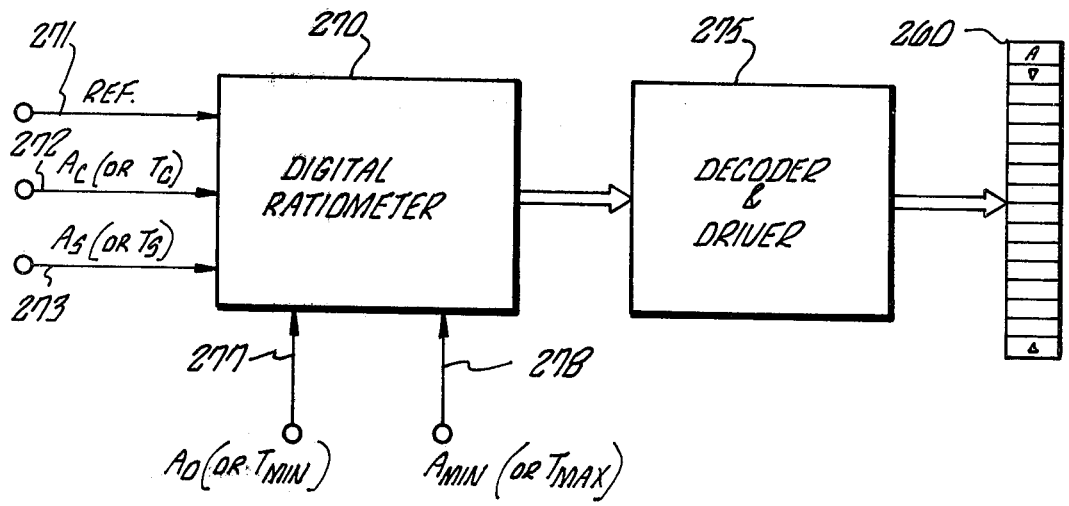

Turning now to FIGS. 7a and 7b, the same illustrate an alternative form of display (FIG. 7a) and a block diagram (FIG. 7b) of a control system therefor. The display shown in FIG. 7a is a form of display which can be provided in the viewing optics of a camera for displaying certain information to the operator, such as the selected aperture As and the computed aperture Ac on the right-hand side 260 of the display, and selected shutter speed Ts and computed shutter speed Tc on the left-hand side of the display 261. Considering the aperture display portion 260, the same includes a series of transparent windows, such as indicated by the numerals 262, which indicia thereon. Beneath these windows are light sources, such as light-emitting diodes. As will appear shortly in the discussion of FIG. 7b, preferably all of the light sources are dimly lit during camera operation, and one source is more brightly lit to indicate Ac and another source also is brighter and is caused to blink at a low frequency to indicate As. For example, Ac may be f8 in which the window with this indicia is more brightly lit than the others, and As may be f11, in which case the light source for that window is caused to blink. As the value As is changed, or the shutter speed is changed, these two (As and Ac) may merge so that only a single source for one of the indicia windows is illuminated. In this manner, a fully electronic "match-needle" display is provided which indicates both As and Ac and indicates when these two are equal. Upper and lower windows 263 and 264 may have sources therebehind for indicating, respectively, "over" and "under" range. An aperture scale 260 thus can be provided which will be useful for numerous different lenses having different ranges of f/stops, and can readily provide an indication when an aperture value is outside the range of the lens.

The shutter speed scale 261 on the left is constructed in a similar manner but, of course, includes different indicia, namely shutter speed values. As with the aperture display 260, all of the sources preferably are dimly lit, Tc is caused to be more brightly lit, and Ts is caused to blink. The display of FIG. 7a, and the control system of FIG. 7b, can be used in lieu of the logic and individual lamp display system of FIG. 4.

Turning now to the control system in FIG. 7b, the same includes a digital ratiometer 270 which receives five inputs. One input is a reference voltage input on line 271, which may be +Vr inasmuch as this is the reference voltage used for the system previously discussed. The ratiometer 270 also receives calculated aperture value Ac on an input line 272 and selected aperture value As on an input line 273. Alternatively, for shutter speed or time display, the input lines 272 and 273 may respectively receive Tc and Ts. The digital ratiometer 270 functions like a digital voltmeter but is calibrated or graduated to provide an output value (its output is equated to, for example, f/stop) and functions to compare Ac versus the reference and to compare As versus the reference. For example, the reference voltage 271 may be considered to have a value of 12 units (e.g., 6 volts divided into half volt increments) which is divided by 12 by a resistor circuit in the input of the digital ratiometer to give a value of one unit. This value (one) is divided into Ac (which, for example, may have a value of 8 in a given condition of operation) thereby giving a value output of 8. For aperture value display, this value can mean f/16 to thereby cause a decoder and driver 275 to cause the eight lamp or LED for f/stop 16 to be brightly illuminated. The ratiometer 270 operates in a similar manner to compare As against the reference to, in turn, cause an appropriate lamp to be illuminated to indicate the value of As.

The digital ratiometer also receives inputs on lines 277 and 278 of Ao and Amax, respectively (or alternatively, for shutter speed indication, Tmin and Tmax). These inputs are used in a manner similar to that illustrated in FIG. 4 to provide the over and under range indications provided on the aperture display 260 of FIG. 7a at 263 and 264. Appropriate logic can be provided to give a low battery indication in the manner previously described.

The decoder and driver 275 normally provides a low current to all of the LED sources to cause them to be dimly illuminated. Then, when a particular LED (for example, for Ac of f16) a larger current is sent to a given LED to increase its brightness. The displays of Ac and As (or Tc and Ts) can be accomplished sequentially by multiplexing Ac and As in the input of the ratiometer 270 according to well-known multiplexing techniques. The blinking display can be provided by applying a low frequency current to the appropriate LED which is to blink. The digital ratiometer 270 can, if desired, include logic similar to that previously described for providing output signals for controlling the motor drive amplifier 104 for control of the iris diaphragm. As will be apparent to those skilled in the art, the digital ratiometer 270 and the decoder and driver of 275 can be manufactured in the form of an integrated circuit chip, and one used with the aperture display 260 and another used with the shutter time display 261 of the display illustrated in FIG. 7a.

While embodiments and applications of this invention have been shown and described, it will be apparent to those skilled in the art that modifications are possible without departing from the inventive concepts herein described.

What is claimed is:

1. In a photographic device having a lens through which light passes for exposing film, and having shutter means interposed between said lens and film for controlling the time of exposure, an electronic system for controlling the shutter means comprising light sensor means for receiving light and providing an electrical output signal as a function of the received light, logarithmic converter means having an input for receiving said electrical output signal and providing an output log signal proportional to brightness value, control circuit means coupled with said logarithmic converter means for receiving said brightness value signal and providing a shutter control signal which is a function of the brightness value signal and other input parameters, and feedback circuit means for receiving said shutter control signal and including amplifier means adapted to be selectively connected with the input of said logarithmic converter means and thereby form a feedback circuit loop including said logarithmic converter means for generating an antilog signal as a function of said shutter control signal, said antilog signal being adapted to control said shutter means.

2. A system as in claim 1 wherein said control circuit means includes calculator circuit means and memory circuit means, said calculator circuit means being connected to said logarithmic converter means for receiving said brightness value signal therefrom and for receiving parameters of log values of wide open aperture and film sensitivity and for computing therefrom an exposure value EV, said memory circuit means being connected with said calculator circuit means for storing said exposure value EV, and said calculator circuit means including circuits for computing from said exposure value EV said shutter control signal.

3. A system as in claim 2 wherein said photographic device comprises a single lens reflex camera having a movable reflector, and said system includes control switch means operated as a function of the position of said movable reflector, said control switch means having a first state of operation for allowing said control circuit means to accumulate said exposure value EV and a second state of operation for causing said memory circuit means to store the accumulated exposure value EV.

4. In a photographic device having a lens through which light passes for exposing film, and having shutter means interposed between said lens and film for controlling the time of exposure, an electronic system for controlling the shutter means comprising light sensor means for receiving light and providing an electrical output signal as a function of the received light, logarithmic converter means having an input for receiving said electrical output signal and providing an output log signal proportional to brightness value, control circuit means coupled with said logarithmic converter means for receiving said brightness value signal and providing a shutter control signal which is a function of the brightness value signal and other input parameters, feedback circuit means for receiving said shutter control signal and adapted to be selectively connected with the input of said logarithmic converter means and form a feedback circuit loop for generating an antilog signal as a function of said shutter control signal, said antilog signal being adapted to control said shutter means, switching means connected between said light sensor means and logarithmic converter means and between said feedback circuit means and logarithmic converter means to selectively apply (a) the signal from said light sensor means to an input of said logarithmic converter means or (b) the antilog signal to the input of said logarithmic converter means, the brightness value output signal of said logarithmic converter means being applied as a first input to said feedback circuit means, and said feedback circuit means having a second input, and said control circuit means comprising calculator circuit means for receiving said brightness value signal and said input parameters, said input parameters comprising a signal proportional to the logarithmic value of film sensitivity and a signal proportional to the logarithmic value of the wide open aperture of said lens, and said calculator circuit means computing therefrom said shutter control signal and applying said shutter control signal to said second input of said feedback circuit means.

5. A system as in claim 4 wherein
said signal from said light sensor comprises a current Ib and said antilog signal comprises a current It,
means for applying a reference current Ir to said logarithmic converter means,
said logarithmic converter means having first and second states of operation wherein (1) said switching means applies current Ib to said logarithmic converter means and the latter provides said brightness value signal as the log of the ratio of Ib to Ir, and (2) wherein said current It is applied to said logarithmic converter means and the latter provides to the first input of said feedback circuit means an output signal which is the log of the ratio of It to Ir.

6. A system as in claim 5 wherein
said switching means comprises a first control connected between said light sensor means and said input of said logarithmic conversion means to apply a current Ib thereto, and a second control connected between said feedback circuit means and said input of said logarithmic converter means to apply said antilog signal in the form of current It to said input of said logarithmic converter means.

7. In a single lens reflex camera having a lens through which light passes for exposing film, having shutter means interposed between said lens and film for controlling the time of exposure, and having a movable reflector, an electronic system for controlling the shutter means comprising light sensor means for receiving light and providing an electrical output signal as a function of the received light, logarithmic converter means having an input for receiving said electrical output signal and providing an output log signal proportional to brightness value, control circuit means coupled with said logarithmic converter means for receiving said brightness value signal and providing a shutter control signal which is a function of the brightness value signal and other input parameters, said control circuit means including calculator circuit means and memory circuit means, said calculator circuit means being connected to said logarithmic converter means for receiving said brightness value signal therefrom and for receiving parameters of log values of wide open aperture and film sensitivity and for computing therefrom an exposure value EV, said memory circuit means being connected with said calculator circuit means for storing said exposure value EV, and said calculator circuit means including circuits for computing from said exposure value EV said shutter control signal, feedback circuit means for receiving said shutter control signal and adapted to be selectively connected with the input of said logarithmic converter means and form a feedback circuit loop for generating an antilog signal as a function of said shutter control signal, said antilog signal being adapted to control said shutter means, control switch means operated as a function of the position of said movable reflector, said control switch means having a first state of operation for allowing said control circuit means to accumulate said exposure value EV and a second state of operation for causing said memory circuit means to store the accumulated exposure value EV, switching means connected between the light sensor means, feedback circuit means and the input of said logarithmic converter means, said switching means comprising a first control connected between said light sensor means and the input of said logarithmic converter means to apply a current Ib thereto and a second control connected between said feedback circuit means and said input of said logarithmic converter means to apply said antilog signal in the form of a current It to said input of said logarithmic converter means, and said control swtich means is connected to control the states of operation of said first and second controls to provide two sequences of operation for said system wherein in the first sequence said current Ib is applied from said light sensor to said logarithmic converter means to enable accumulation of said exposure value EV and wherein in the second sequence of operation said antilog signal It is applied to said input of said logarithmic converter means and said signal It is controlled by said feedback circuit means.

8. A system as in claim 7 wherein
said feedback circuit means includes a differential amplifier for receiving as a first input the output of the logarithmic converter means and for receiving as a second input said shutter control signal from said control means, the output of said amplifier being connected to control the magnitude of the antilog signal It passed by said second control.

9. A system as in claim 7 wherein
said first control of said switching means is an on/off switch and said second control thereof is a variable control for varying the magnitude of signal It as a function of the output of said differential amplifier.

10. In a photographic device having a lens through which light passes for exposing film, and having shutter means interposed between said lens and film for controlling the time of exposure and including a variable diaphragm for controlling the amount of light reaching the film, an electronic system for controlling the shutter means comprising light sensor means for receiving light and providing an electrical output signal Ib as a function of the received light, first control means connected with said light sensor means for receiving signal Ib and selectively passing the same to the output of the first control means, second control means for selectively controlling the passage and magnitude of a shutter timing current It therethrough and having a control input for controlling the magnitude of said current It therethrough, logarithmic converter means having an input connected with the output of the first control means and with the It current path of said second control means for selectively providing an output log signal which in one sequence of operation of said system is a function of Ib and which in another sequence of operation of said system is a function of It, calculator means connected with the output of the logarithmic converter means and adapter to receive log signals as a function of (a) wide open aperture value of said lens, (b) selected aperture value of said lens, (c) sensitivity value of said film, and (d) selected shutter speed of said shutter means, and to receive said log signal from said logarithmic converter means which is a function of Ib and to compute therefrom an exposure value EV, said calculator means having memory means for accumulating said exposure value EV during said first sequence of operation of said system and for storing said exposure value EV during said second sequence of operation of said system, said calculator means providing a shutter control signal as a function of one or more input parameters thereto, and differential circuit means for receiving from said calculator means said shutter control signal and for receiving from said logarithmic converter means during said second sequence of operation of said system said output log signal as a function of It, said differential circuit means having an output coupled to the control input of said second control means for controlling It during the second sequence of operation of said system, It being an antilog signal adapted to control the speed of said shutter means.

11. In a photographic device having a lens through which light passes for exposing film, and having shutter means interposed between said lens and film for controlling the time of exposure, and including a variable diaphragm for controlling the amount of light reaching the film, an electronic system for metering light passing through said lens and for controlling the speed of the shutter means as a function of the light and input parameters to said system comprising light sensor means for receiving light passing through said lens and providing an electrical output signal as a function of the received light, a logarithmic converter for performing a log conversion of the output signal of said light sensor means to a brightness value signal Bv and for performing an antilog conversion with respect to a shutter time signal to provide a shutter control signal It, said logarithmic converter having an input for receiving said output signal of said light sensor in a first phase of operation of said system and for receiving said shutter control signal It in a second phase of operation of said system, said log converter having an output, calculator means for receiving the output of said logarithmic converter and for calculating therefrom and from log input signals representing a lens aperture parameter and a film sensitivity parameter said shutter time signal, and feedback circuit means for receiving the output of the logarithmic converter and for receiving the shutter time signal from said calculator means, and having an output for controlling said shutter control signal It.

12. In a photographic device having a lens through which light passes for exposing film, and having shutter means interposed between said lens and film for controlling time of exposure, said photographic device including a reflector means which is in a first position during a light measuring phase of operation and in a second position during a film exposure phase of operation during which said shutter means is controlled, an electronic system comprising light sensor means for receiving light passing through the lens and providing an electrical output signal as a function of the received light, a logarithmic converter for performing a log function during said light measuring phase and an antilog function during said film exposure phase, said logarithmic converter having an input and an output, first switching means connected between said light sensor means and said logarithmic converter for passing the electrical output signal from the light sensor means to the logarithmic converter input during the light measuring phase of operation of said photographic device, calculator means having an input circuit for receiving the output of the logarithmic converter as a log signal Bv and for receiving input logarithmic signals comprising signals representing selected shutter speed Ts, film sensitivity S, open aperture Ao of said lens, and selected aperture As of said lens, said calculator means having a calculator circuit connected with said input circuit for calculating an exposure value EV, EV being a mathematical function of Bv, Ao and S, said calculator circuit having means for calculating from said exposure value EV and said signals representing Ts and As output logarithmic signals representing calculated exposure time Tc and calculated aperture value Ac, and said calculator means including memory circuit means coupled with said calculator circuit for storing said exposure value EV during said film exposure phase of operation, feedback circuit means having a first input connected with said calculator means for receiving said calculated exposure time Tc and having a second input for receiving the output of said logarithmic converter, said feedback circuit means applying a shutter time signal to said input of said logarithmic converter during said film exposure phase of operation of said photographic device and controlling the magnitude of said shutter time signal for controlling the operation of said shutter means, and second switch means operated as a function of the positions of said reflector means and connected to said first switching means, calculator means and feedback circuit means for controlling the application of the output signal of said light sensor means to said logarithmic converter during the light measuring phase of operation, and for controlling the application of the shutter time signal from said feedback circuit means to said logarithmic converter and controlling storage of said exposure value EV by said memory circuit means during said film exposure phase of operation.

13. In a photographic device having a lens through which light passes for exposing film, and having shutter means interposed between said lens and film for controlling the time of exposure, said photographic device having a first operation phase wherein said light is measured and a second operation phase wherein said shutter means is controlled, an electronic system comprising light sensor means for receiving light passing through the lens and providing an electrical output signal as a function of the received light, a logarithmic converter for performing log and antilog functions and having an input and an output, switching means connected between said light sensor means and said logarithmic converter for passing the electrical output signal from the light sensor means to the logarithmic converter during the first phase of operation of said photographic device, calculator means for receiving the output of said logarithmic converter and calculating a shutter control signal therefrom and from log input signals representing a lens aperture parameter and a film sensitivity parameter, and feedback circuit means having a first input connected with said calculator means for receiving said shutter control signal and having a second input for receiving the output of said logarithmic converter, said feedback circuit means applying a shutter time signal to said input of said logarithmic converter during the second phase of operation of said photographic device and controlling the magnitude of said shutter time signal for controlling the operation of said shutter means.

14. A calculator for use with a photographic device for calculating an exposure time Tc and an aperture value Ac comprising first input circuit means for receiving (1) a brightness value signal Bv comprising a logarithmic signal which is a function of light received by a light sensor and (2) signals which are logarithmic values corresponding to the wide open aperture Ao of a lens through which said light impinges and the sensitivity values of film to be exposed, first amplifier means having an input coupled to said input circuit means and for providing an output signal which is a function of exposure value EV, EV being a mathematical function of Bv, Ao and S, second input circuit means for receiving a signal which is a function of the log value of a shutter speed parameter and for receiving the output of said first amplifier means, second amplifier means having an input coupled to said second input circuit means and for providing an output signal which is a function of calculated aperture value Ac which is equal to EV minus said shutter speed parameter applied to said second input means, third input circuit means for receiving a signal which is a function of the log value of an aperture parameter and for receiving the output of said first amplifier means, and third amplifier means having an input connected to said third input circuit means and for providing an output which is a function of calculated shutter speed Tc and which is equal to Ev minus said aperture parameter.

15. A calculator as in claim 14 wherein said shutter speed parameter is selected shutter speed Ts, and said aperture parameter is selected aperture As, and said first input circuit means includes feedback means connected from the output to the input of said first amplifier means, said second input circuit means includes feedback means connected from the output to the input of the second amplifier means, and said third input circuit means includes feedback means connected from he output to the input of said third amplifier means.

16. A calculator as in claim 14 wherein said first amplifier means includes a first amplifier stage to which said input circuit means is coupled, and has a second amplifier stage from which said output signal thereof is provided, and switching means connected from the output of said first amplifier stage to the input of said second amplifier stage, memory means coupled with said switching means for accumulating a signal which is a function of exposure value EV in a first phase of operation, and for storing a signal which is a function of the accumulated exposure value EV in a second phase of operation, and means for controlling said switching means to assume a first state in said first phase of operation and to assume a second state in said second phase of operation.

17. A calculator for use with a photographic device for calculating exposure time Tc and an aperture value Ac comprising input circuit means having a plurality of inputs for receiving logarithmic signals, said logarithmic signals comprising signals representing selected shutter speed Ts, film sensitivity S, open aperture Ao of an objective lens, selected aperture As of said objective lens, and a brightness value Bv, calculator circuit means connected with said input circuit means for calculating an exposure value EV, EV being a mathematical function of Bv, Ao and S, said calculator circuit means having means for calculating from said exposure value EV and said signals representing Ts and As output logarithmic signals representing calculated exposure time Tc and calculated aperture value Ac, and memory circuit means coupled with said calculator circuit means for receiving and storing said exposure value EV.

18. In a photographic device having a lens through which light passes for exposing film, and having shutter means interposed between said lens and film for controlling the time of exposure, an electronic system and display comprising light sensor means for receiving light and providing an electrical output signal as a function of the received light, calculator means for receiving the electrical output signal from said light sensor means and for receiving input parameters of selected shutter speed, film sensitivity and selected shooting aperture, and for computing therefrom calculated shutter speed and calculated aperture, display means connected to the calculator means and having a shutter speed scale and an aperture scale, and having respective first and second series of light sources associated with the respective scales for illuminating indicia of each scale for thereby providing an indication of shutter speed and aperture, and circuit means coupled with said sources and responsive to said calculator means for increasing the illumination of two sources of each series corresponding to respective shutter speed parameters and aperture parameters, the displayed parameters of the first series of sources being selected shutter speed and computed shutter speed, and the displayed parameters of the second series of sources being selected aperture and computed aperture.

19. A system as in claim 18 wherein
said circuit means includes means for providing a blinking indication from at least one of said sources of one of said series of sources.

20. In a photographic device having a lens through which light passes for exposing film, and having shutter means interposed between said lens and film for controlling the time of exposure, an electronic system and display comprising
light sensor means for receiving light and providing an electrical output signal as a function of the received light,
calculator means for receiving the electrical output signal from said light sensor means and for receiving input parameters and for computing therefrom at least one exposure parameter,
display means connected to the calculator means and having an indicator scale and a series of light sources associated with said scale for illuminating indicia thereon for thereby providing a display of one of said input parameters and said exposure parameter, and
circuit means coupled with said sources and responsive to said calculator means for increasing the illumination of two of said sources corresponding respectively to said one input parameter and said exposure parameter.

21. A system as in claim 20 wherein
said input parameters are film sensitivity and selected shooting aperture, said exposure parameter is calculated aperture, and said displayed one input parameter is shooting aperture.

22. A system as in claim 20 wherein
said input parameters are film sensitivity and selected shutter speed, said exposure parameter is calculated shutter speed, and said displayed one input parameter is selected shutter speed.

23. In a photographic device having a lens through which light passes for exposing film, and having shutter means interposed between said lens and film for controlling the time of exposure, and electronic system for controlling the shutter means comprising
light sensor means for receiving light and providing an electrical output signal as a function to the received light,
logarithmic converter means having an input for receiving said electrical output signal and providing an output log signal,
calculator means coupled with said logarithmic converter means for receiving said output log signal and providing a shutter control signal which is a function of the output log signal and other exposure input parameters, and
amplifier means having a first input for receiving said shutter control signal, said amplifier means having an output adapted to be selectively connected with the input of said logarithmic converter means and having means connecting the output of the logarithmic converter means to a second input of the amplifier means to form a feedback circuit loop comprising the amplifier means and logarithmic converter means for providing an antilog signal as a function of said shutter control signal, said antilog signal being adapted to control said shutter means.

24. In a photographic device having a lens through which light passes for exposing film, and having shutter means interposed between said lens and film for controlling the time of exposure, an electronic system and display comprising
light sensor means for receiving light and providing an electrical output signal as a function of the received light,
calculator means for receiving the electrical output signal from said light sensor means and for receiving input parameters of selected shutter speed, film sensitivity and selected aperture, and for computing therefrom calculated shutter speed and calculated aperture,
display means connected to the calculator means and having a shutter speed scale and an aperture scale, and having respective first and second series of light sources associated with the respective scales for illuminating indicia of each scale for thereby providing an indication of shutter speed and aperture, and
circuit means coupled with said sources and responsive to said calculator means for causing said display means to indicate selected shutter speed and computed shutter speed from one series of light sources and to indicate selected aperture and computed aperture from the other series of light sources.

25. In a photographic device having shutter means for controlling the time of exposure of film, an electronic system and display comprising
light sensor means for receiving light and providing an electrical output signal as a function of the received light,
calculator means for receiving the electrical output signal from the light sensor means and for receiving input parameters of selected shutter speed, film sensitivity and selected shooting aperture, and for computing therefrom calculated shutter speed and calculated aperture,
logic circuit means for receiving said input parameters of selected shutter speed, selected shooting aperture and for receiving said computed parameters of calculated shutter speed and calculated aperture, and for receiving input parameters of maximum aperture value and predetermined shutter speed signals, said logic circuit means responding to said received parameters for developing under exposure and over exposure signals, and
display means coupled to said logic circuit means for providing over exposure and under exposure visual indications.

26. A system as in claim 25 wherein
said logic circuit means includes oscillator means to cause blinking of visual indications from said display means.

27. A calculator for use with a photographic device for calculating exposure time and an aperture value comprising
input circuit means having a plurality of inputs for receiving signals, said signals representing selected shutter speed, film sensitivity, brightness value, and selected aperture of an objective lens,
calculator circuit means connected with said input circuit means for calculating an exposure value, the exposure value being a mathematical function of said brightness value and film sensitivity, said calculator circuit means having means for calculating from said exposure value and said signals representing selected shutter speed and selected aperture output signals representing calculated exposure time and calculated aperture value, and memory circuit means coupled with said calculator circuit means for receiving and storing said exposure value.

28. A system for use with a photographic device for determining exposure time and an aperture value comprising input circuit means having a plurality of inputs for receiving signals representing selected shutter speed, film sensitivity, brightness value, and selected aperture of an objective lens, first circuit means connected with said input circuit means for determining an exposure value, the exposure value being a mathematical function of said brightness value and film sensitivity, said first circuit means having means for determining from said exposure value and said signals representing selected shutter speed and selected aperture output signals representing a calculated exposure value and calculated aperture value, and second circuit means coupled with said first circuit means for selectively causing one of said calculated values to be a selected mathematical function of said exposure value.

29. In a photographic device having a lens through which light passes for exposing film, and having shutter means interposed between said lens and film for controlling the time of exposure, an electronic system and display comprising light sensor means for receiving light and providing an electrical output signal as a function of the received light, calculator means for receiving the electrical output signal from said light sensor means and for receiving input parameters and for computing therefrom at least one exposure parameter, display means connected to the calculator means and having an indicator scale and a series of light sources associated with said scale for illuminating indicia thereon for thereby providing a display of said exposure parameter and an input parameter, and circuit means coupled with said sources, said circuit means being responsive to said calculator means for energizing two of said sources corresponding to said exposure parameter and an input parameter.

30. In a photographic device having a lens through which light passes for exposing film, and having shutter means interposed between said lens and film for controlling the time of exposure, an electronic system and display comprising light sensor means for receiving light and providing an electrical output signal as a function of the received light, calculator means for receiving the electrical output signal from said light sensor means and for receiving input parameters and for computing therefrom at least one exposure parameter, display means connected to the calculator means and having an indicator scale and a series of light sources associated with said scale for illuminating indicia thereon for thereby providing a display of one of said input parameters and said exposure parameter, the said one input parameter comprising selected aperture or shutter speed and the exposure parameter comprising computed aperture or computed shutter speed, and circuit means coupled with said sources, said circuit means being responsive to said calculator means for enhancing the illumination of two of said sources corresponding respectively to said one input parameter and said exposure parameter.

31. In a photographic device having a lens through which light passes for exposing film, and having shutter means interposed between said lens and film for controlling the time of exposure, an electronic system and display comprising light sensor means for receiving light and providing an electrical output signal as a function of the received light, circuit means for receiving the electrical output signal from said light sensor means and for receiving input parameters of a first shutter speed value, film sensitivity and a first aperture value, and for providing output signals representing a second shutter speed value and a second aperture value, display means connected to the circuit means and having a shutter speed scale and an aperture scale, and having respective first and second series of light sources associated with the respective scales for illuminating indicia of each scale for thereby providing an indication of shutter speed and aperture, and second circuit means coupled with said sources and being responsive to said calculator means for energizing one source of each series corresponding to a respective shutter speed value and aperture value to enhance the illumination thereof, the one source of one series representing a first shutter speed value or first aperture value and the one source of the other series respectively representing a second aperture value or second shutter speed value.

32. A system as in claim 31 wherein said circuit means includes means for providing a blinking indication from one of said sources representing an enhanced value of one of said series of sources.

33. A system for use with a photographic device for determining exposure time and an aperture value comprising input circuit means having a plurality of inputs for receiving signals representing selected shutter speed, film sensitivity, brightness value, and selected aperture of an objective lens, first circuit means connected with said input circuit means for determining an exposure value EV, the exposure value being a mathematical function of said brightness value and film sensitivity, said first circuit means having means for determining from said exposure value and said signals representing selected shutter speed and selected aperture output signals representing a calculated exposure parameter and calculated aperture parameter Ac, and second circuit means coupled with said first circuit means for selectively causing said calculated aperture parameter Ac to be a selected mathematical function of said exposure value EV wherein $AC = -KEV$, and said second circuit means includes means for selecting a value for K.

* * * * *